(12) United States Patent
Aminaka

(10) Patent No.: US 10,774,878 B2
(45) Date of Patent: Sep. 15, 2020

(54) OUTER JOINT MEMBER OF A CONSTANT VELOCITY UNIVERSAL JOINT

(71) Applicant: NTN CORPORATION, Osaka (JP)

(72) Inventor: Tatsuyoshi Aminaka, Shizuoka (JP)

(73) Assignee: NTN CORPORATION, Osaka (JP)

( * ) Notice: Subject to any disclaimer, the term of this patent is extended or adjusted under 35 U.S.C. 154(b) by 282 days.

(21) Appl. No.: 15/580,013

(22) PCT Filed: Jun. 1, 2016

(86) PCT No.: PCT/JP2016/066317
§ 371 (c)(1),
(2) Date: Dec. 6, 2017

(87) PCT Pub. No.: WO2016/199655
PCT Pub. Date: Dec. 15, 2016

(65) Prior Publication Data
US 2018/0180101 A1 Jun. 28, 2018

(30) Foreign Application Priority Data
Jun. 11, 2015 (JP) .................................. 2015-118207

(51) Int. Cl.
*F16D 3/223* (2011.01)
*B23K 33/00* (2006.01)
(Continued)

(52) U.S. Cl.
CPC .............. *F16D 3/223* (2013.01); *B23K 15/04* (2013.01); *B23K 26/24* (2013.01); *B23K 26/28* (2013.01);
(Continued)

(58) Field of Classification Search
CPC .......... F16D 3/223; F16D 1/027; F16D 3/227; F16D 3/2055; F16D 2250/0076;
(Continued)

(56) References Cited

U.S. PATENT DOCUMENTS 5,376,050 A * 12/1994 Krude ................... F16D 3/2055
9,670,963 B2 * 6/2017 Metzger ................. F16D 3/845
(Continued)

FOREIGN PATENT DOCUMENTS

JP 61-273275 12/1986
JP 2-59892 5/1990
(Continued)

OTHER PUBLICATIONS

Supplementary European Search Report dated Jan. 30, 2019 in counterpart European Patent Application No. 16807362.5.
(Continued)

*Primary Examiner* — Greg Binda
(74) *Attorney, Agent, or Firm* — Wenderoth, Lind & Ponack, L.L.P.

(57) ABSTRACT

An outer joint member of a constant velocity universal joint includes a cup section having track grooves formed in an inner periphery thereof, which are engageable with torque transmitting elements, and a shaft section formed at a bottom portion of the cup section. The cup section and the shaft section are formed as separate members, and by bringing a cup member forming the cup section and a shaft member forming the shaft section into abutment against each other at respective joining end surfaces and welding them, a hollow cavity portion is formed. The cup member has, at an axial center, a ventilation hole that communicates with the hollow cavity portion and any one of the joining end surfaces of the cup member and the joining end surface of the shaft member has a welding spatter receiving groove formed on a radially inner side thereof.

11 Claims, 16 Drawing Sheets

(51) Int. Cl.
  *B23K 15/04* (2006.01)
  *B23K 26/24* (2014.01)
  *B23K 26/28* (2014.01)
  *F16D 3/227* (2006.01)
  *F16D 1/027* (2006.01)
  *B23K 101/00* (2006.01)
  *F16D 3/205* (2006.01)

(52) U.S. Cl.
  CPC .............. *B23K 33/00* (2013.01); *F16D 1/027* (2013.01); *F16D 3/227* (2013.01); *B23K 2101/006* (2018.08); *F16D 3/2055* (2013.01); *F16D 2003/22326* (2013.01); *F16D 2250/0076* (2013.01); *Y10S 464/906* (2013.01); *Y10T 403/473* (2015.01); *Y10T 403/478* (2015.01)

(58) Field of Classification Search
  CPC .......... F16D 2003/22326; B23K 26/28; B23K 26/24; B23K 15/04; B23K 33/00; B23K 2101/006; Y10T 403/473; Y10T 403/478; Y10S 464/906
  USPC ................ 464/146, 182, 906; 403/268, 271; 219/121.13, 121.14
  See application file for complete search history.

(56) References Cited

U.S. PATENT DOCUMENTS

2008/0019767 A1* 1/2008 Bittner .................. B23K 11/14
2016/0201730 A1 7/2016 Osugi et al.

FOREIGN PATENT DOCUMENTS

| JP | 5-25601 | 4/1993 |
|---|---|---|
| JP | 2000-329151 | 11/2000 |
| JP | 2005-279778 | 10/2005 |
| JP | 2013-2586 | 1/2013 |
| JP | 2013-94783 | 5/2013 |
| JP | 2015-64101 | 4/2015 |

OTHER PUBLICATIONS

International Preliminary Report on Patentability and Written Opinion of the International Searching Authority dated Dec. 12, 2017 in International Application No. PCT/JP2016/066317.

International Search Report dated Aug. 30, 2016 in International (PCT) Application No. PCT/JP2016/066317.

* cited by examiner

OUTER JOINT MEMBER OF A CONSTANT VELOCITY UNIVERSAL JOINT

TECHNICAL FIELD

The present invention relates to an outer joint member of a constant velocity universal joint.

BACKGROUND ART

In a constant velocity universal joint, which is used to construct a power transmission system for automobiles and various industrial machines, two shafts on a driving side and a driven side are coupled to each other to allow torque transmission therebetween, and rotational torque can be transmitted at a constant velocity even when each of the two shafts forms an operating angle. The constant velocity universal joint is roughly classified into a fixed type constant velocity universal joint that allows only angular displacement, and a plunging type constant velocity universal joint that allows both the angular displacement and axial displacement. In a drive shaft configured to transmit power from an engine of an automobile to a driving wheel, for example, a plunging type constant velocity universal joint is used on a differential side (inboard side), and the fixed type constant velocity universal joint is used on a driving wheel side (outboard side).

Irrespective of the plunging type and the fixed type, the constant velocity universal joint mainly includes an outer joint member including a cup section having track grooves formed in an inner peripheral surface thereof and engageable with torque transmitting elements, and a shaft section that extends from a bottom portion of the cup section in an axial direction. In many cases, the outer joint member is constructed by integrally forming the cup section and the shaft section by subjecting a rod-like solid blank (bar material) to plastic working such as forging and ironing or processing such as cutting work, heat treatment, and grinding.

Incidentally, as the outer joint member, an outer joint member including a long shaft section (long stem) may sometimes be used. In order to equalize lengths of a right intermediate shaft and a left intermediate shaft, the long stem is used for an outer joint member on the inboard side that corresponds to one side of the drive shaft. The long stem is rotatably supported by a rolling bearing. Although varied depending on vehicle types, the length of the long stem section is approximately from 250 mm to 400 mm in general. In the outer joint member, the long shaft section causes difficulty in integrally forming the cup section and the shaft section with high accuracy at low cost. Therefore, there has been proposed an outer joint member that is constructed by forming the cup section and the shaft section as separate members and applying electron beam welding (Patent Document 1).

Further, as an outer joint member of a type in which a cup member forming a cup section and a shaft member forming a shaft section are welded, there has been proposed an outer joint member having a ventilation hole that communicates with a hollow cavity portion formed in a joint portion of the members to suppress variation in internal pressure of the hollow cavity portion (Patent Document 2).

PRIOR ART DOCUMENTS

Patent Document 1: JP 2015-64101 A
Patent Document 2: JP 2013-2586 A

SUMMARY OF THE INVENTION

Problems to be Solved by the Invention

According to the manufacturing method for an outer joint member described in Patent Document 1, a joining end surface of the cup member and a joining end surface of the shaft member are brought into abutment against each other, and the cup member and the shaft member are welded by irradiating a light beam from an outer side to the abutment portion in a radial direction. Further, an outer diameter of the joining end surface is set to an equal dimension for each joint size. With this configuration, there has been proposed an excellent manufacturing method for an outer joint member, which is capable of increasing the strength of the welded portion and the quality, reducing the welding cost, enhancing productivity of the cup member and the shaft member, achieving the cost reduction through the standardization of a product type of the cup member, and reduction of a burden of production management. However, there has been found a problem in that, when a sealed space during welding is set to a medium vacuum state at a level of enabling industrial production, entry of heat during welding may cause a small amount of residual air to push the welded portion radially outward, with the result that a weld length becomes insufficient. In Patent Document 1, no focus is given to such a problem.

In the outer joint member described in Patent Document 2, the ventilation hole that communicates with the hollow cavity portion is formed. However, welding in a vacuum environment is not intended. In addition, no focus is given to the problem in that a spatter caused by welding enters the cup section through the ventilation hole.

In the cup section of the outer joint member, there are formed track grooves for torque transmission and a fitting surface for a cage. According to the present invention, focus is given to the fact that entry of the spatter caused by welding into the cup section may hinder the torque transmission and adversely influence durability and NVH (noise, vibration, and harshness; the same apply hereinafter) properties.

The present invention has been proposed in view of the above-mentioned problems, and has an object to provide an outer joint member which secures a weld length of the outer joint member of a constant velocity universal joint and prevents entry of a spatter caused by welding into a cup section of the outer joint member, thereby preventing degradation in durability and NVH properties of a constant velocity universal joint.

Solution to the Problems

As a technical measure to achieve the above-mentioned object, according to one embodiment of the present invention, there is provided an outer joint member of a constant velocity universal joint, comprising: a cup section having track grooves formed in an inner periphery of the cup section, which are engageable with torque transmitting elements; and a shaft section formed at a bottom portion of the cup section, the outer joint member being constructed by forming the cup section and the shaft section as separate members, and by bringing a cup member forming the cup section and a shaft member forming the shaft section into abutment against each other and welding the cup member and the shaft member, the cup member and the shaft member being brought into abutment against each other at respective joining end surfaces, to thereby form a hollow cavity portion, the cup member having, at an axial center of the cup member, a ventilation hole that communicates with the hollow cavity portion, any one of the joining end surface of the cup member and the joining end surface of the shaft member having a welding spatter receiving groove on a radially inner side thereof.

With the above-mentioned configuration, the weld length of the outer joint member is secured, and entry of the spatter caused by welding into the cup section of the outer joint member is prevented, thereby being capable of preventing degradation in durability and NVH properties of the constant velocity universal joint.

The above-mentioned ventilation hole has a center hole, and hence it is advantageous in terms of processing of the center hole.

The above-mentioned welding spatter receiving groove is set to an equal dimension for each joint size, and hence it is advantageous in terms of processing and standardization of a product type.

Effects of the Invention

According to the outer joint member of the constant velocity universal joint of the present invention, it is possible to secures a weld length of the outer joint member and prevent entry of a spatter caused by welding into the cup section of the outer joint member, thereby preventing degradation in durability and NVH properties of the constant velocity universal joint.

EMBODIMENTS OF THE INVENTION

Now, description is made of embodiments of the present invention with reference to the drawings.

Figure 1:
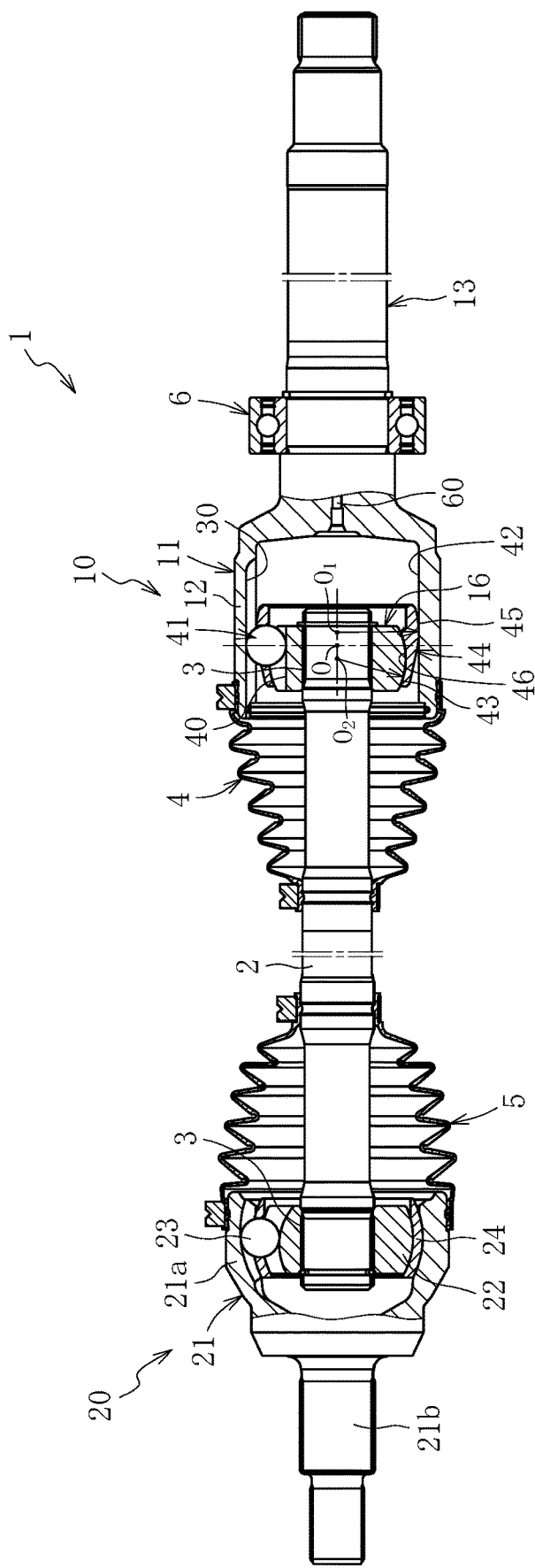
FIG. 1 is a view for illustrating the entire structure of a drive shaft to which an outer joint member of a constant velocity universal joint according to a first embodiment of the present invention is applied.
Figure 2:
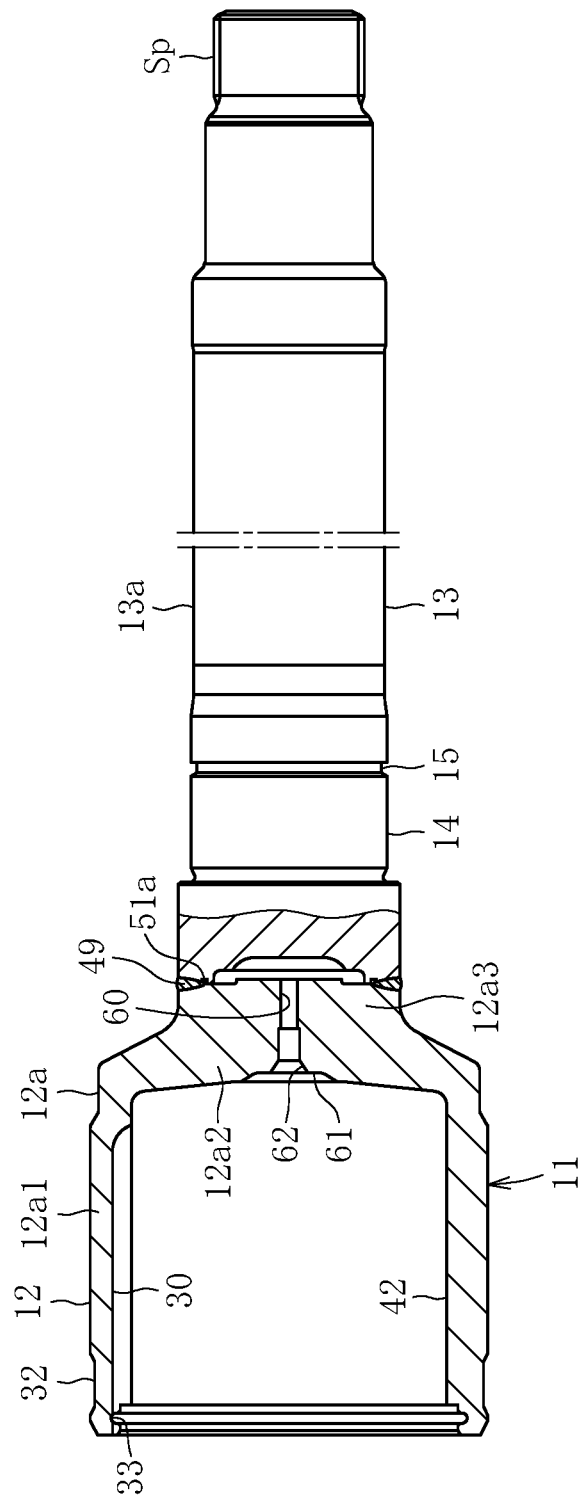
FIG. 2 is an enlarged partial vertical sectional view for illustrating the outer joint member of FIG. 1.

FIG. 1 to FIG. 3 are illustrations of an outer joint member of a constant velocity universal joint according to a first embodiment of the present invention. FIG. 4 to FIG. 11 are illustrations of a method of manufacturing the outer joint member according to the first embodiment.

FIG. 1 is a view for illustrating the entire structure of a drive shaft 1 using an outer joint member 11 according to the first embodiment. The drive shaft 1 mainly comprises a plunging type constant velocity universal joint 10 arranged on a differential side (right side of FIG. 1: hereinafter also referred to as "inboard side"), a fixed type constant velocity universal joint 20 arranged on a driving wheel side (left side of FIG. 1: hereinafter also referred to as "outboard side"), and an intermediate shaft 2 configured to couple both the constant velocity universal joints 10 and 20 to allow torque transmission therebetween.

The plunging type constant velocity universal joint 10 illustrated in FIG. 1 is a so-called double-offset type constant velocity universal joint (DOJ). The constant velocity universal joint 10 comprises the outer joint member 11 comprising a cup section 12 and a long shaft section (hereinafter referred to also as "long stem section") 13 that extends from a bottom portion of the cup section 12 in an axial direction, an inner joint member 16 housed along an inner periphery of the cup section 12 of the outer joint member 11, balls 41 serving as torque transmitting elements that are arranged between track grooves 30 and 40 of the outer joint member 11 and the inner joint member 16, and a cage 44 having a spherical outer peripheral surface 45 and a spherical inner peripheral surface 46 that are fitted to a cylindrical inner peripheral surface 42 of the outer joint member 11 and a spherical outer peripheral surface 43 of the inner joint member 16, respectively, and being configured to retain the balls 41. A curvature center $O_1$ of the spherical outer peripheral surface 45 and a curvature center $O_2$ of the spherical inner peripheral surface 46 of the cage 44 are offset equidistantly from a joint center O toward opposite sides in the axial direction.

An inner ring of a support bearing 6 is fixed to an outer peripheral surface of the long stem section 13, and an outer ring of the support bearing 6 is fixed to a transmission case with a bracket (not shown). The outer joint member 11 is supported by the support bearing 6 in a freely rotatable manner, and when the support bearing 6 as described above is provided, vibration of the outer joint member 11 during driving or the like is prevented as much as possible.

The fixed type constant velocity universal joint 20 illustrated in FIG. 1 is a so-called Rzeppa type constant velocity universal joint, and comprises an outer joint member 21 comprising a bottomed cylindrical cup section 21a and a shaft section 21b that extends from a bottom portion of the cup section 21a in the axial direction, an inner joint member 22 housed along an inner periphery of the cup section 21a of the outer joint member 21, balls 23 serving as torque transmitting elements that are arranged between the cup section 21a of the outer joint member 21 and the inner joint member 22, and a cage 24, which is arranged between an inner peripheral surface of the cup section 21a of the outer joint member 21 and an outer peripheral surface of the inner joint member 22, and is configured to retain the balls 23. As the fixed type constant velocity universal joint 20, an undercut-free type constant velocity universal joint may sometimes be used.

The intermediate shaft 2 comprises splines 3 for torque transmission (including serrations; the same applies hereinafter) at outer diameter portions on both end portions thereof. The spline 3 on the inboard side is spline-fitted to a hole portion of the inner joint member 16 of the plunging type constant velocity universal joint 10. Thus, the intermediate shaft 2 and the inner joint member 16 of the plunging type constant velocity universal joint 10 are coupled to each other to allow torque transmission therebetween. Further, the spline 3 on the outboard side is spline-fitted to a hole portion of the inner joint member 22 of the fixed type constant velocity universal joint 20. Thus, the intermediate shaft 2 and the inner joint member 22 of the fixed type constant velocity universal joint 20 are coupled to each other to allow torque transmission therebetween. Although the solid intermediate shaft 2 is illustrated, a hollow intermediate shaft may be used instead.

Grease is sealed inside both the constant velocity universal joints 10 and 20 as a lubricant. To prevent leakage of the grease to an outside of the joint or entry of a foreign matter from the outside of the joint, bellows boots 4 and 5 are respectively mounted to a portion between the outer joint member 11 of the plunging type constant velocity universal joint 10 and the intermediate shaft 2 and a portion between the outer joint member 21 of the fixed type constant velocity universal joint 20 and the intermediate shaft 2.

The outer joint member according to the first embodiment is described with reference to FIG. 2. FIG. 2 is an enlarged partial vertical sectional view for illustrating the outer joint member 11. The outer joint member 11 comprises the bottomed cylindrical cup section 12 that is opened at one end and has the cylindrical inner peripheral surface 42 and the plurality of track grooves 30, on which the balls 41 (see FIG. 1) are caused to roll, formed equiangularly on the inner peripheral surface, and the long stem section 13 that extends from the bottom portion of the cup section 12 in the axial direction and comprises a spline Sp serving as a torque transmitting coupling portion formed at an outer periphery on an end portion thereof on an opposite side to the cup section 12. The outer joint member 11 is formed by welding a cup member 12a and a shaft member 13a to each other.

The cup member 12a is an integrally-formed product being made of medium carbon steel, such as S53C, containing carbon of from 0.40 wt % to 0.60 wt %, and having a cylindrical portion 12a1 and a bottom portion 12a2. The cylindrical portion 12a1 has the track grooves 30 and the cylindrical inner peripheral surface 42 formed at an inner periphery thereof. A projecting portion 12a3 is formed at the bottom portion 12a2 of the cup member 12a. A boot mounting groove 32 is formed at an outer periphery of the cup member 12a on the opening side thereof, whereas a snap ring groove 33 is formed at an inner periphery of the cup member 12a on the opening side thereof. A bearing mounting surface 14 and a snap ring groove 15 are formed at an outer periphery of the shaft member 13a on the cup member 12a side, whereas the spline Sp is formed at an end portion of the shaft member 13a on an opposite side.

Figure 3A:
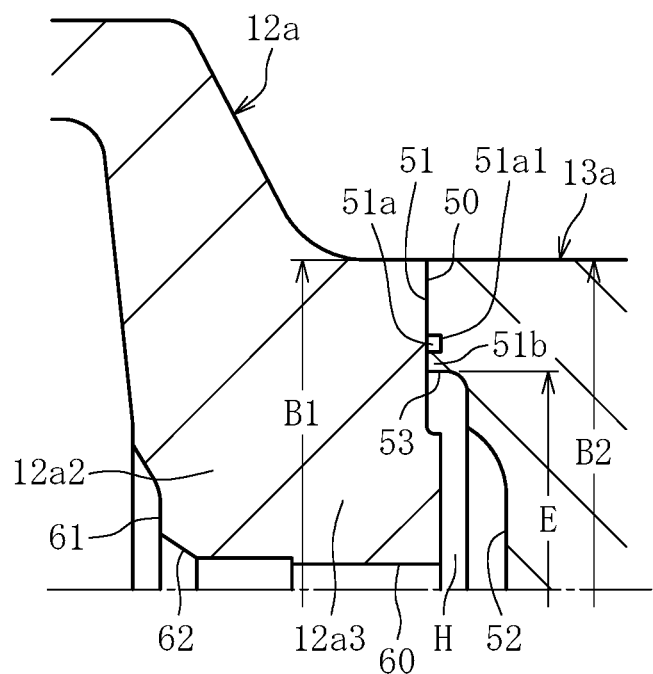
FIG. 3a is an enlarged illustration of a portion around a joining portion of a cup member and a shaft member of the outer joint member of FIG. 2, and is a vertical sectional view for illustrating a state before welding.
Figure 3B:
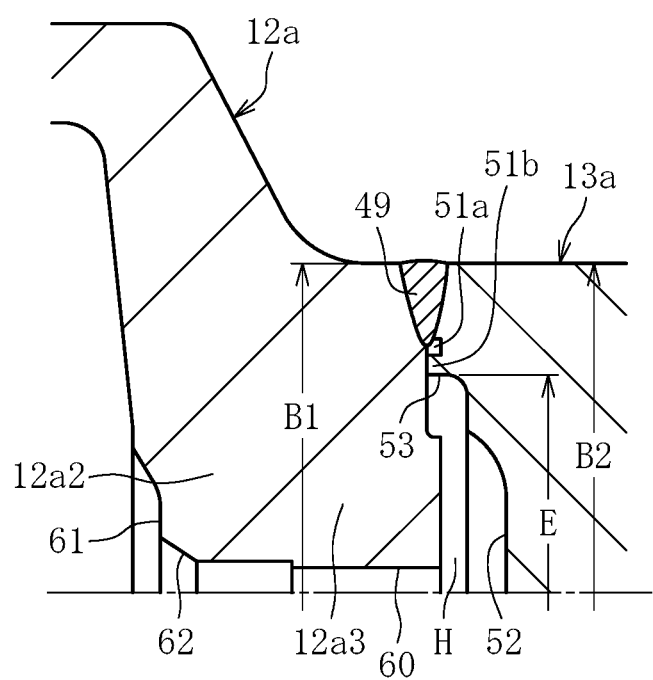
FIG. 3b is an enlarged illustration of a portion around the joining portion of the cup member and the shaft member of the outer joint member of FIG. 2, and is a vertical sectional view for illustrating a state after welding.

The shaft member 13a is made of medium carbon steel, such as S40C, containing carbon of from 0.30 wt % to 0.55 wt %. As illustrated in FIG. 3a and FIG. 3b, a joining end surface 50 formed at the projecting portion 12a3 of the bottom portion 12a2 of the cup member 12a and a joining end surface 51 formed at an end portion of the shaft member 13a on the cup member 12a side are brought into abutment against each other, and are welded to each other by electron beam welding performed from an outer side of the cup member 12a in a radial direction. A welded portion 49 is formed of a bead, which is formed by a beam radiated from a radially outer side of the cup member 12a. Although detailed description is made later, outer diameters B1 and B2 of the joining end surface 50 and the joining end surface 51 are set to equal dimensions for each joint size. However, the outer diameter B1 of the joining end surface 50 of the cup member 12a and the outer diameter B2 of the joining end surface 51 of the shaft member 13a need not be set to equal dimensions. In consideration of, for example, a state of the weld bead, a dimensional difference may be given as appropriate in such a manner that the outer diameter B2 of the joining end surface 51 is set slightly smaller than the outer diameter B1 of the joining end surface 50, or that the outer diameter B2 of the joining end surface 51 is set slightly larger than the outer diameter B1 of the joining end surface 50, conversely. The description "the outer diameters B1 and B2 of the joining end surface 50 and the joining end surface 51 are set to equal dimensions for each joint size" herein refers to a concept encompassing a case where the dimensional difference is given as appropriate between the outer diameter B1 of the joining end surface 50 and the outer diameter B2 of the joining end surface 51.

As illustrated in FIG. 2 and FIG. 3a, the welded portion 49 is formed on the joining end surface 51 located on the cup member 12a side with respect to the bearing mounting surface 14 of the shaft member 13a, and hence the bearing mounting surface 14 and the like can be processed in advance so that post-processing after welding can be omitted. Further, due to the electron beam welding, burrs are not generated at the welded portion. Thus, post-processing for the welded portion can also be omitted, which can reduce manufacturing cost. Still further, total inspection on the welded portion through ultrasonic flaw detection can be performed.

Features of the outer joint member 11 according to the first embodiment are described with reference to FIG. 3a and FIG. 3b. As illustrated in FIG. 3a, the joining end surface 50 of the cup member 12a is formed by annular turning, and a center portion in a radial direction maintains a forged surface. With this, a turning time is shortened. At an axial center of the cup member 12a, there is formed a ventilation hole 60 penetrating through the bottom portion 12a2 of the cup member 12a. In the bottom portion 12a2 of the cup member 12a, there is formed a counterbore portion 61. A center hole 62 is formed in the counterbore portion 61. The center hole 62 is used to receive and center the center hole guide in manufacturing steps for the outer joint member 11 described later. The ventilation hole 60 is formed at the axial center of the cup member 12a, and hence it is advantageous in terms of strength of a product. Further, the center hole 62 is formed in the ventilation hole 60, and hence it is advantageous in terms of processing of the center hole 62.

A welding spatter receiving groove 51a is formed on a radially inner side of the joining end surface 51 of the shaft member 13a, and an annular blocking portion 51b is formed more on a radially inner side. As illustrated in FIG. 3b, the welding spatter receiving groove 51a is formed in a weld joint interface directly below the bead of the welded portion 49. When the both joining end surfaces 50 and 51 are brought into abutment against each other, a hollow cavity portion H is formed. However, one end of the ventilation hole 60 is open to the hollow cavity portion H, and hence the hollow cavity portion H communicates with outside air.

The hollow cavity portion H communicates with the outside air through the ventilation hole 60. Therefore, when a sealed space during welding is set to a medium vacuum state at a level of enabling industrial production, the problem in that entry of heat during welding causes a small amount of residual air to push the welded portion 49 radially outward to thereby result in insufficient weld length can be prevented. Herein, the medium vacuum state corresponds to a vacuum state of from 100 Pa to 0.1 Pa as defined in JIS 8126-1.

The ventilation hole 60 is formed. Therefore, when the cup member 12a and the shaft member 13a are brought into abutment against each other, and electron beam welding is performed in a medium vacuum (low pressure) atmosphere at the level of enabling industrial production of a constant velocity universal joint being a mass-produced product, no recess is formed on the radially inner side of the bead of the welded portion 49, and the radially inner end portion of the bead of the welded portion 49 is sufficiently formed to reach the welding spatter receiving groove 51a, thereby being capable of securing the weld length. With this configuration, the strength, quality, and reliability of the welded portion can be improved.

Further, a spatter caused by welding is caught in the welding spatter receiving groove 51a, and the presence of the annular blocking portion 51b causes the spatter to remain in the welding spatter receiving groove 51a. Therefore, entry of the spatter into the cup section 12a of the outer joint member 11 is prevented, thereby being capable of preventing degradation in durability and NVH properties of the constant velocity universal joint 10.

The annular blocking portion 51b and the joining end surface 51 are flush with each other. However, a gap having a size of preventing outflow of the spatter is formed between the annular blocking portion 51b and the joining end surface 50, and ventilation is performed through the gap. It is desired that a ratio of the gap that is formed between the annular blocking portion 51b and the joining end surface 50 to a length of the annular blocking portion 51b in the radial direction be 4 or more. A small spatter having been found in past welding has a diameter of about 0.2 mm. When the gap between the annular blocking portion 51b and the joining end surface 50 is 0.2 mm, the spatter can pass through the gap in theory. However, passage of the spatter can be prevented by increasing the length of the annular blocking portion 51b in the radial direction in accordance with the gap that can be set.

The welding spatter receiving groove 51a has a width of from about 1 mm to about 3 mm and a depth of from about 0.5 mm to 2 mm. A groove bottom corner portion 51a1 (see FIG. 3a) of the welding spatter receiving groove 51a has a suitable curve in consideration of stress concentration. The welding spatter receiving groove 51a is also set to an equal dimension for each joint size. Therefore, it is advantageous in terms of processing and standardization of a product type.

The welding spatter receiving groove 51a is formed in the shaft member 13a, and hence the welding spatter receiving groove 51a can easily be formed at the time of turning of the shaft member 13a.

Figure 4:
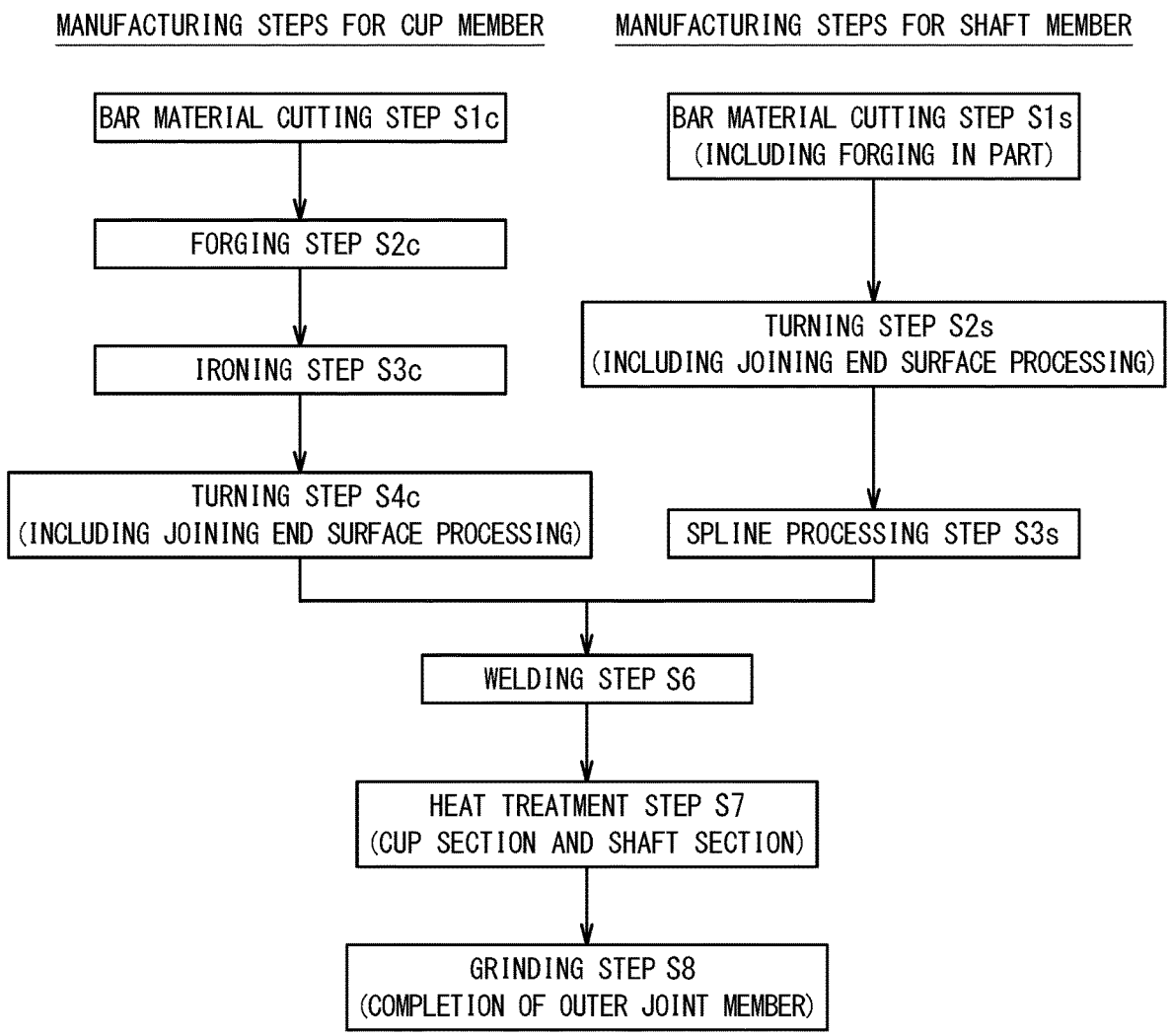
FIG. 4 is an illustration of an overview of manufacturing steps for the outer joint member of FIG. 1.

Next, the method of manufacturing the outer joint member according to the first embodiment is described with reference to FIG. 4 to FIG. 11. FIG. 4 is an illustration of the overview of the manufacturing steps for the outer joint member. In the first embodiment, as illustrated in FIG. 4, the cup member 12a is manufactured through manufacturing steps comprising a bar material cutting step S1c, a forging step S2c, an ironing step S3c, and a turning step S4c. Meanwhile, the shaft member 13a is manufactured through manufacturing steps comprising a bar material cutting step S1s, a turning step S2s, and a spline processing step S3s. Intermediate components of the cup member 12a and the shaft member 13a thus manufactured are each assigned with a product number for management.

After that, the cup member 12a and the shaft member 13a are subjected to a welding step S6, a heat treatment step S7, and a grinding step S8 so that the outer joint member 11 is completed.

An overview of each step is described. Each step is described as a typical example, and appropriate modification and addition may be made to each step as needed. First, the manufacturing steps for the cup member 12a are described.

[Bar Material Cutting Step S1c]

A bar material is cut into a predetermined length in accordance with a forging weight, thereby producing a billet.

[Forging Step S2c]

The billet is subjected to forging so as to integrally form the cylindrical portion, the bottom portion, and the projecting portion as a preform of the cup member 12a.

[Ironing Step S3c]

Ironing is performed on the track grooves 30 and the cylindrical inner peripheral surface 42 of the preform, thereby finishing the inner periphery of the cylindrical portion of the cup member 12a.

[Turning Step S4c]

In the preform after ironing, the outer peripheral surface, the boot mounting groove 32, the snap ring groove 33, the joining end surface 50, the ventilation hole 60, and the like are formed by turning. In the first embodiment, after the turning step S4c, the cup member 12a in the form of an intermediate component is assigned with a product number for management.

Next, the manufacturing steps for the shaft member 13a are described.

[Bar Material Cutting Step S1s]

A bar material is cut into a predetermined length in accordance with the entire length of the shaft section, thereby producing a billet. After that, the billet is forged into a rough shape by upset forging depending on the shape of the shaft member 13*a* in some cases.

[Turning Step S2*s*]

The outer peripheral surface of the billet or the preform (bearing mounting surface 14, snap ring groove 15, minor diameter of the spline, end surface, and the like), the joining end surface 51 of the billet at the end portion on the cup member 12*a* side, and the welding spatter receiving groove 51*a* are formed by turning.

[Spline Processing Step S3*s*]

The spline is formed by rolling in the shaft member after turning. Note that, the processing for the spline is not limited to the rolling, and press working or the like may be adopted instead as appropriate. In the first embodiment, after the spline processing, the shaft member 13*a* in the form of an intermediate component is assigned with a product number for management.

Next, the manufacturing steps in the process of completing the outer joint member 11 from the cup member 12*a* and the shaft member 13*a* are described.

[Welding Step S6]

The joining end surface 50 of the cup member 12*a* and the joining end surface 51 of the shaft member 13*a* are brought into abutment against each other and welded.

[Heat Treatment Step S7]

Induction quenching and tempering are performed as heat treatment on at least the track grooves 30 and the cylindrical inner peripheral surface 42 of the cup section 12 after welding and a necessary range of the outer periphery of the shaft section 13 after welding. Heat treatment is not performed on the welded portion. A hardened layer having a hardness of approximately from 58 HRC to 62 HRC is formed on each of the track grooves 30 and the cylindrical inner peripheral surface 42 of the cup section 12. Further, a hardened layer having a hardness of approximately from 50 HRC to 62 HRC is formed in a predetermined range of the outer periphery of the shaft section 13.

[Grinding Step S8]

After the heat treatment, the bearing mounting surface 14 of the shaft section 13 and the like are finished by grinding. Thus, the outer joint member 11 is completed.

In the manufacturing steps, the heat treatment step is provided after the welding step, and hence the manufacturing steps are suited to a cup member and a shaft member having such shapes and specifications that the hardness of the heat-treated portion may be affected by temperature rise at the periphery due to heat generated during the welding.

Figure 5A:
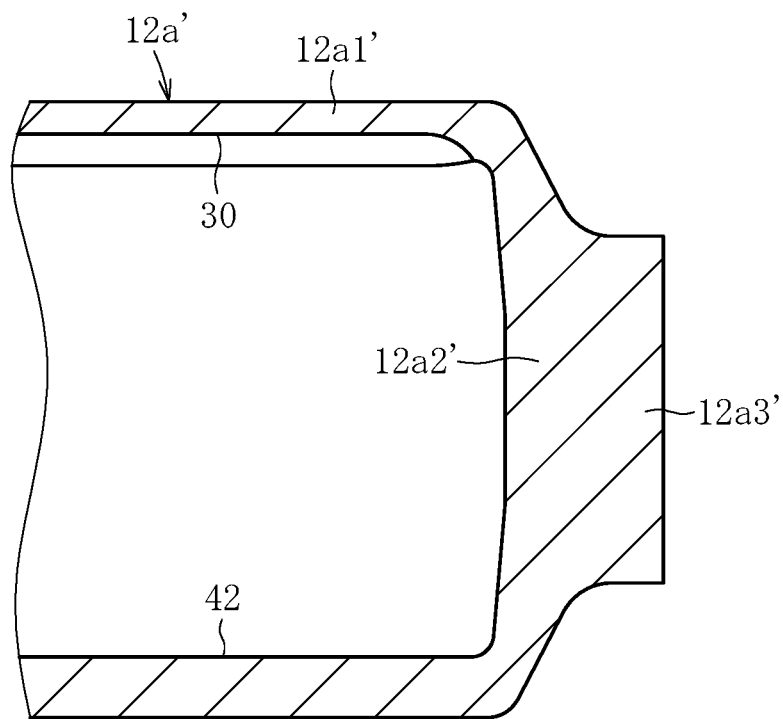
FIG. 5a is a vertical sectional view for illustrating the cup member before welding and after ironing.
Figure 5B:
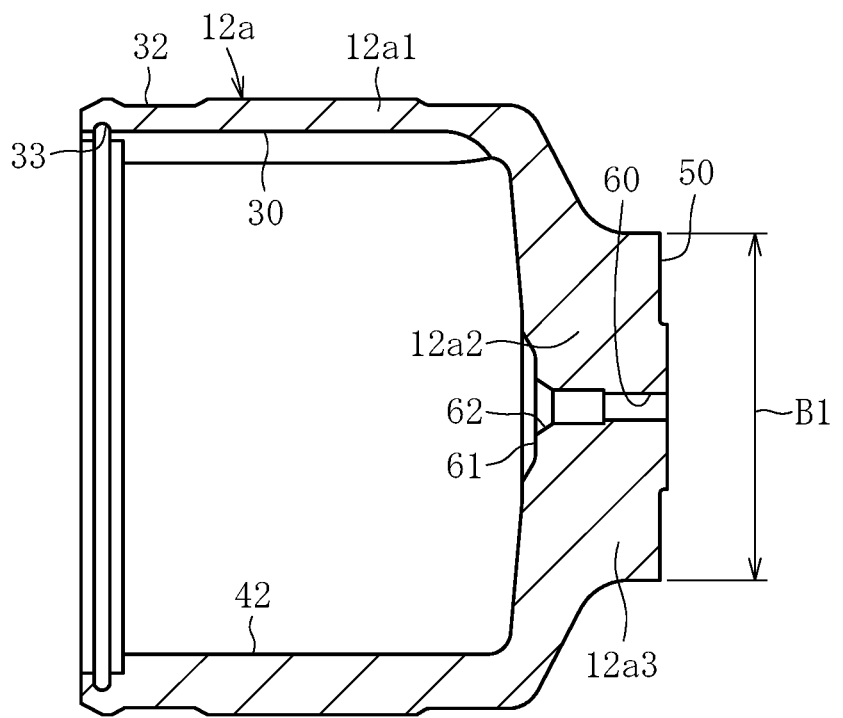
FIG. 5b is a vertical sectional view for illustrating the cup member before welding and after turning.

Next, main constituent features of the method of manufacturing the outer joint member are described in detail. FIG. 5*a* is a vertical sectional view for illustrating a state after ironing of the cup member 12*a*. FIG. 5*b* is a vertical sectional view for illustrating a state after turning. In a preform 12*a'* for the cup member 12*a*, a cylindrical portion 12*a*1', a bottom portion 12*a*2', and a projecting portion 12*a*3' are integrally formed in the forging step S2*c*. After that, the track grooves 30 and the cylindrical inner peripheral surface 42 are formed by ironing in the ironing step S3*c* so that the inner periphery of the cylindrical portion 12*a*1' is finished as illustrated in FIG. 5*a*.

After that, in the turning step S4*c*, the outer peripheral surface, the boot mounting groove 32, the snap ring groove 33, and the like of the cup member 12*a* as well as the joining end surface 50 of the projecting portion 12*a*3 of the bottom portion 12*a*2, the outer diameter B1 thereof, and the ventilation hole 60 (including the counterbore portion 61 and the center hole 62) are formed by turning as illustrated in FIG. 5*b*.

Figure 6A:
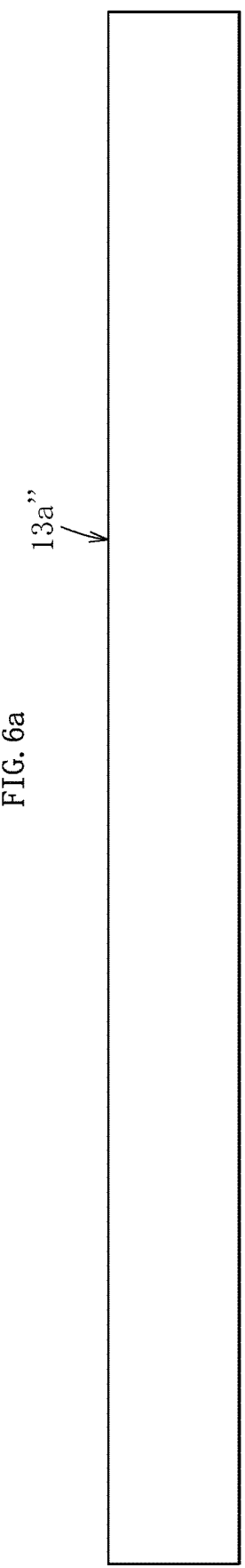
FIG. 6a is a front view for illustrating the shaft member before welding, that is a billet obtained by cutting a bar material.
Figure 6B:
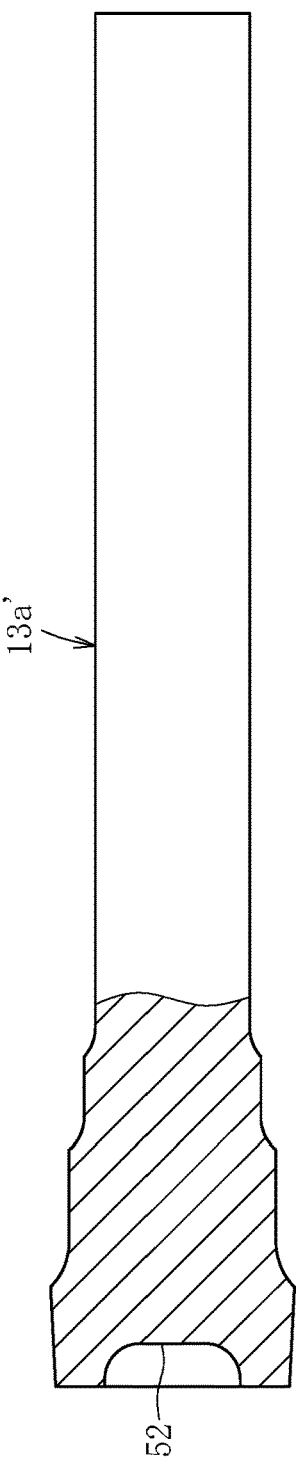
FIG. 6b is a partial vertical sectional view for illustrating the shaft member before welding and after forging.
Figure 6C:
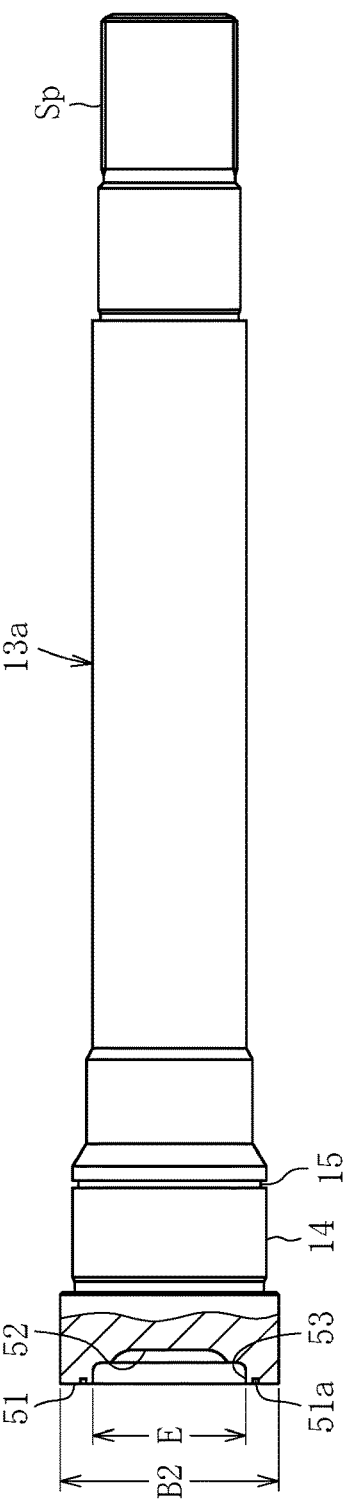
FIG. 6c is a partial vertical sectional view for illustrating the shaft member before welding and after turning and spline processing.

FIG. 6 are illustrations of states of the shaft member 13*a* in the respective processing steps. FIG. 6*a* is a front view for illustrating a billet 13*a''* obtained by cutting a bar material. FIG. 6*b* is a partial vertical sectional view for illustrating a preform 13*a'* obtained by forging the billet 13*a''* into a rough shape by upset forging. FIG. 6*c* is a partial vertical sectional view for illustrating the shaft member 13*a* after turning and spline processing.

The billet 13*a''* illustrated in FIG. 6*a* is produced in the bar material cutting step S1*s*. The preform 13*a'* is produced by increasing the shaft diameter of the billet 13*a''* in a predetermined range and forming a recessed portion 52 at a joining-side end portion (end portion on the cup member 12*a* side) by upset forging as needed as illustrated in FIG. 6*b*.

After that, in the turning step S2*s*, the outer diameter of the shaft member 13*a*, the bearing mounting surface 14, the snap ring groove 15, an inner diameter surface 53 (inner diameter E) of the recessed portion 52, the joining end surface 51, the outer diameter B2 thereof, and the welding spatter receiving groove 51*a* are formed by turning as illustrated in FIG. 6*c*. In the spline processing step S3*s*, the spline Sp is processed at the end portion on the opposite side to the recessed portion 52 by rolling or press forming.

The outer diameter B1 of the joining end surface 50 of the cup member 12*a* illustrated in FIG. 5*b* is set to an equal dimension for one joint size. Further, in the shaft member 13*a* illustrated in FIG. 6*c*, which is used as a long stem shaft, the outer diameter B2 of the joining end surface 51 is set to an equal dimension for one joint size irrespective of the shaft diameter and the outer peripheral shape. Still further, the joining end surface 51 of the shaft member 13*a* is located at the position on the cup member 12*a* side with respect to the bearing mounting surface 14. Through the setting of dimensions as described above, the outer joint member 11 compatible with various vehicle types can be manufactured in such a manner that, while the cup member 12*a* is prepared for common use, only the shaft member 13*a* is manufactured to have a variety of shaft diameters, lengths, and outer peripheral shapes depending on vehicle types, and both the members 12*a* and 13*a* are welded to each other. Details of the preparation of the cup member 12*a* for common use are described later.

Figure 7:
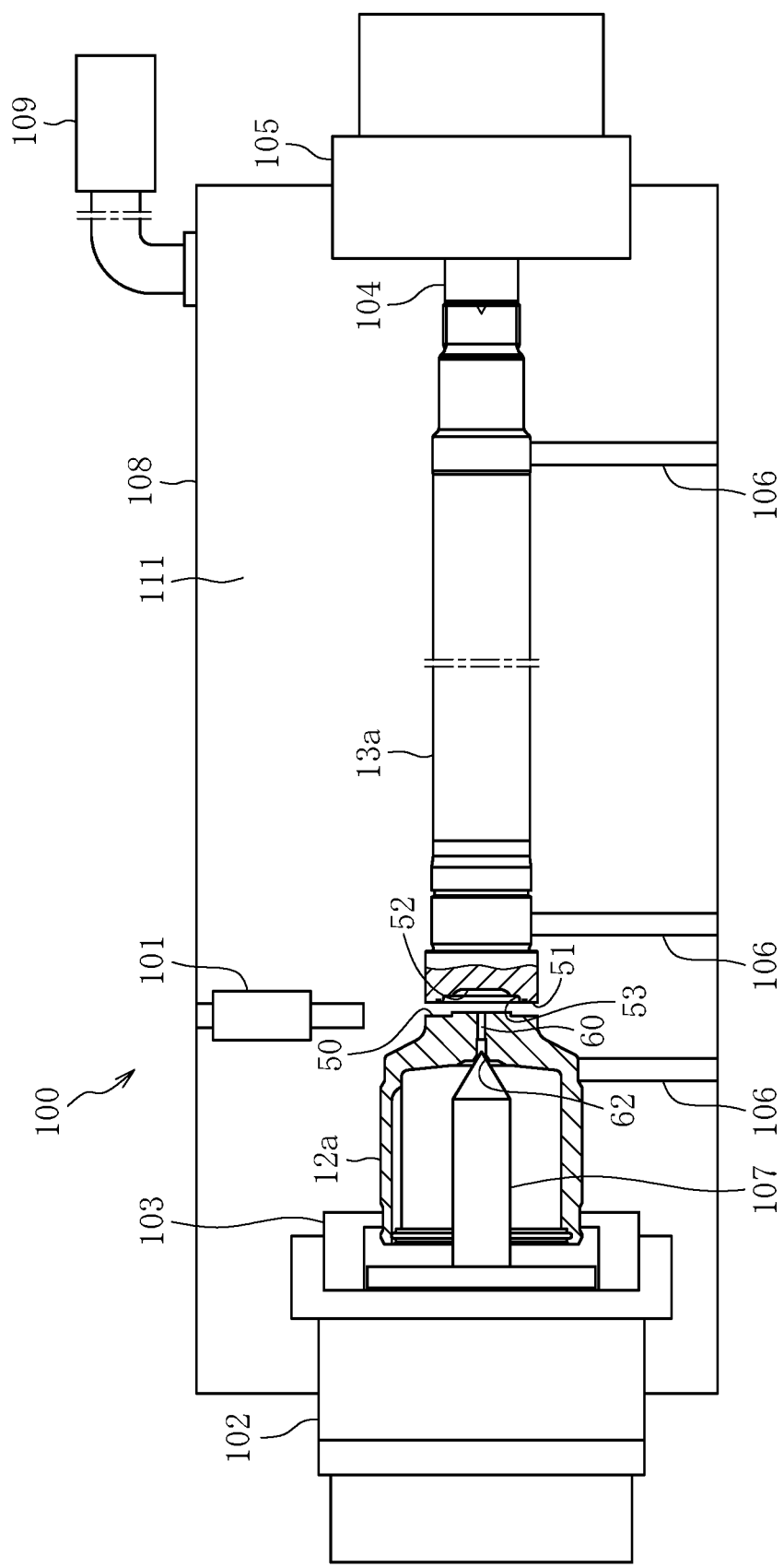
FIG. 7 is a view for illustrating an overview of a welding step.
Figure 8:
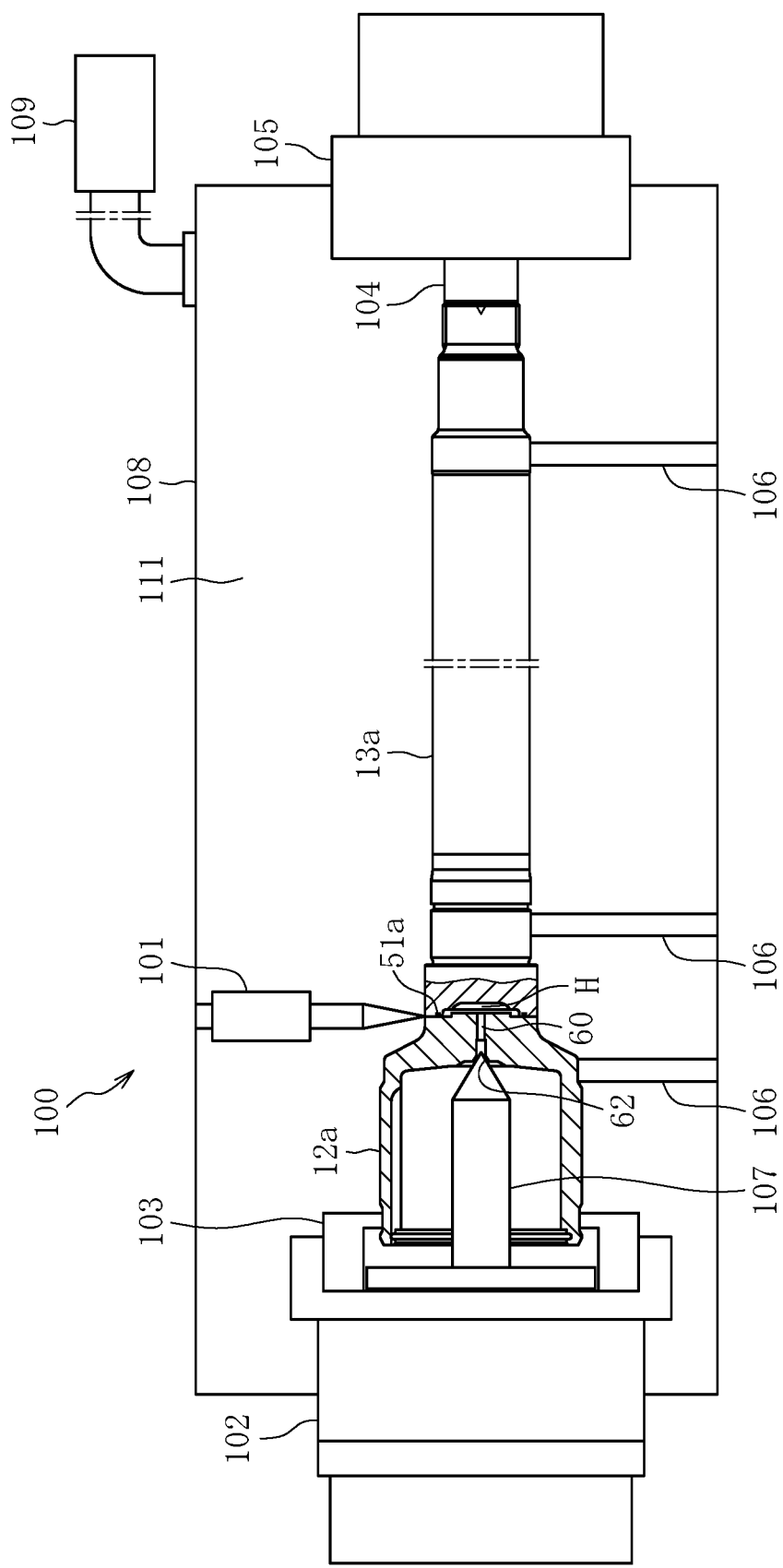
FIG. 8 is a view for illustrating an overview of the welding step.

Next, a method of welding the cup member 12*a* and the shaft member 13*a* is described with reference to FIG. 7 and FIG. 8. FIG. 7 and FIG. 8 are views for illustrating an overview of a welding apparatus. FIG. 7 is an illustration of a state before welding. FIG. 8 is an illustration of a state during welding. As illustrated in FIG. 7, a welding apparatus 100 mainly comprises an electron gun 101, a rotation device 102, a chuck 103, a center hole guide 104, a tailstock 105, workpiece supports 106, a center hole guide 107, a case 108, and a vacuum pump 109.

The cup member 12*a* and the shaft member 13*a* being workpieces are placed on the workpiece supports 106 arranged inside the welding apparatus 100. The chuck 103 and the center hole guide 107 arranged at one end of the welding apparatus 100 are coupled to the rotation device 102. The chuck 103 grips the cup member 12*a* under a state in which the center hole guide 107 is fitted to the center hole 62 to center the cup member 12*a*, thereby applying rotational movement. The center hole guide 104 is integrally mounted to the tailstock 105 arranged at another end of the welding apparatus 100. Both the center hole guide 104 and the tailstock 105 are configured to reciprocate in the axial direction (lateral directions of FIG. 7 and FIG. 8).

A center hole of the shaft member 13a is set on the center hole guide 104 so that the shaft member 13a is centered. The vacuum pump 109 is connected to the case 108 of the welding apparatus 100. A "sealed space" herein refers to a space 111 defined by the case 108. In the first embodiment, the cup member 12a and the shaft member 13a are entirely received in the sealed space 111. The electron gun 101 is arranged at a position corresponding to the joining end surfaces 50 and 51 of the cup member 12a and the shaft member 13a. The electron gun 101 is configured to approach the workpieces up to a predetermined position.

Next, the operation of the welding apparatus 100 constructed as described above and the welding method are described. The cup member 12a and the shaft member 13a being workpieces are stocked at a place different from the place of the welding apparatus 100. The respective workpieces are taken out by, for example, a robot, are conveyed into the case 108 of the welding apparatus 100 opened to the air as illustrated in FIG. 7, and are set at predetermined positions on the workpiece supports 106. At this time, the center hole guide 104 and the tailstock 105 are retreated to the right side of FIG. 7, and hence a gap is formed between the joining end surfaces 50 and 51 of the cup member 12a and the shaft member 13a. After that, a door (not shown) of the case 108 is closed, and the vacuum pump 109 is activated to reduce the pressure in the sealed space 111 defined in the case 108. Thus, the pressures in the recessed portion 52 and the inner diameter portion 53 of the shaft member 13a and the ventilation hole 60 are reduced as well.

When the pressure in the sealed space 111 is reduced to a predetermined pressure, the center hole guide 104 and the tailstock 105 are advanced to the left side as illustrated in FIG. 8 to eliminate the gap between the joining end surfaces 50 and 51 of the cup member 12a and the shaft member 13a. The cup member 12a is centered by fitting the center hole guide 107 to the center hole 62, and is fixed by the chuck 103, whereas the shaft member 13a is supported by the center hole guide 104. After that, the workpiece supports 106 are moved away from the workpieces. At this time, the distance between the workpiece supports 106 and the workpieces may be infinitesimal, and hence illustration of this distance is omitted from FIG. 8. As a matter of course, the welding apparatus 100 may have such a structure that the workpiece supports 106 are retreated downward greatly.

Although illustration is omitted, the electron gun 101 is then caused to approach the workpieces up to a predetermined position, and the workpieces are rotated to start pre-heating. As a pre-heating condition, unlike the welding condition, the temperature is set lower than the welding temperature by, for example, radiating an electron beam under a state in which the electron gun 101 is caused to approach the workpieces so as to increase the spot diameter. Through the pre-heating, the cooling rate after welding is reduced, thereby being capable of preventing a quenching crack. When a predetermined pre-heating time has elapsed, the electron gun 101 is retreated to a predetermined position, and radiates the electron beam from the outer side of the workpieces in the radial direction to start welding.

As described above with reference to FIG. 3a and FIG. 3b, the shaft member 13a has the welding spatter receiving groove 51a that is formed in the weld joint interface directly below the bead of the welded portion 49 on the radially inner side of the joining end surface 51, and the annular blocking portion 51b is formed on the radially inner side. The gap between the annular blocking portion 51b and the joining end surface 50 is set to the gap having a size of preventing outflow of the spatter, and ventilation is performed through the gap. Further, the hollow cavity portion H formed between the cup member 12a and the shaft member 13a communicates with the outside air through the ventilation hole 60. In the welding step, the center hole guide 107 is fitted to the center hole 62 formed in the ventilation hole 60, and air passes through the contact portion formed by fitting.

The hollow cavity portion H communicates with the outside air through the ventilation hole 60. Therefore, when the medium vacuum state at the level of enabling industrial production is given during welding, entry of heat during welding does not cause a small amount of residual air to push the welded portion 49 radially outward, thereby being capable of securing the weld length. Further, the spatter caused by welding is caught in the welding spatter receiving groove 51a, and the presence of the annular blocking portion 51b causes the spatter to remain in the welding spatter receiving groove 51a. Therefore, entry of the spatter into the cup section 12a of the outer joint member 11 is prevented, thereby being capable of preventing degradation in durability and NVH properties of the constant velocity universal joint 10. When the welding is terminated, the electronic gun 101 is retreated, and the rotation of the workpiece is stopped.

Although illustration is omitted, the sealed space 111 is then opened to the air. Then, under a state in which the workpiece supports 106 are raised to support the workpieces, the center hole guide 104 and the tailstock 105 are retreated to the right side, and the chuck 103 is opened. After that, for example, the robot grips the workpieces, takes the workpieces out of the welding apparatus 100, and places the workpieces into alignment on a cooling stocker. In the welding apparatus 100, the cup member 12a and the shaft member 13a are entirely received in the sealed space 111, and hence the configuration of the sealed space 111 defined in the case 108 can be simplified.

Specifically, the cup member 12a having a carbon content of from 0.4% to 0.6% and the shaft member 13a having a carbon content of from 0.3% to 0.55% were used and welded to each other in the above-mentioned welding apparatus 100 under the condition that the pressure in the sealed space 111 defined in the case 108 was set to 6.7 Pa or less. In order to prevent the cup member 12a and the shaft member 13a from being cooled rapidly after the welding to suppress increase in hardness of the welded portion, the joining end surfaces 50 and 51 of the cup member 12a and the shaft member 13a were soaked by pre-heating to have a temperature of from 300° C. to 650° C., and then electron beam welding was performed. As a result, a welded portion 49 having a projecting height from the welded surface (0.5 mm or less), which imposed no adverse effect on assembly of the bearing 6 to the shaft section of the outer joint member 11, was obtained. Further, through the soaking by pre-heating, the hardness of the welded portion after completion of the welding was able to be kept within a range of from 200 Hv to 500 Hv, thereby being capable of attaining high welding strength and stable welding state and quality. Still further, the cup member 12a and the shaft member 13a were welded to each other under the condition that the pressure in the sealed space 111 of the welding apparatus 100 was set to an atmospheric pressure or less, thereby being capable of suppressing the change in pressure in the hollow cavity portion during the welding. As a result, the blowing of a molten material and the entry of the molten material toward the radially inner side were able to be prevented. Setting of the pressure in the sealed space 111 defined in the case 108 to 6.7 Pa or less is a vacuum (low pressure) condition at the level of enabling industrial production of the constant velocity universal joint being a mass-produced product for automobiles and the like.

Further, no recess was formed on the radially side of the bead of the welded portion 49, and the radially inner end portion of the bead was sufficiently formed to reach the welding spatter receiving groove 51a. Therefore, the weld length was able to be secured. With this configuration, the strength, quality, and reliability of the welded portion can be improved. Further, it was able to be confirmed that entry of the spatter into the cup section 12a of the outer joint member 11 was prevented, thereby being capable of preventing degradation in durability and NVH properties of the constant velocity universal joint 10.

Figure 9:
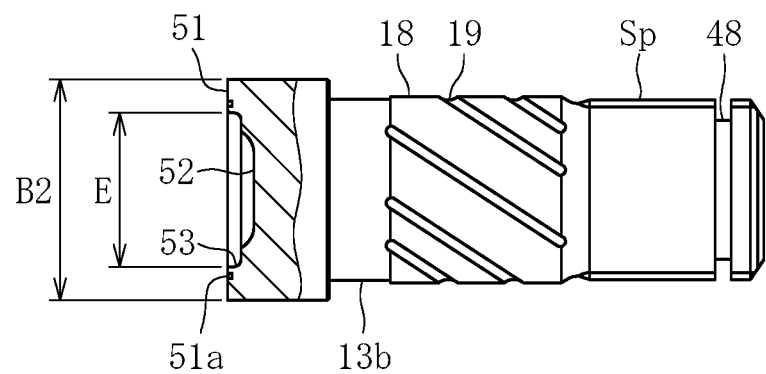
FIG. 9 is a front view for illustrating a shaft member assigned with a product number different from that of the shaft member of FIG. 6c.
Figure 10:
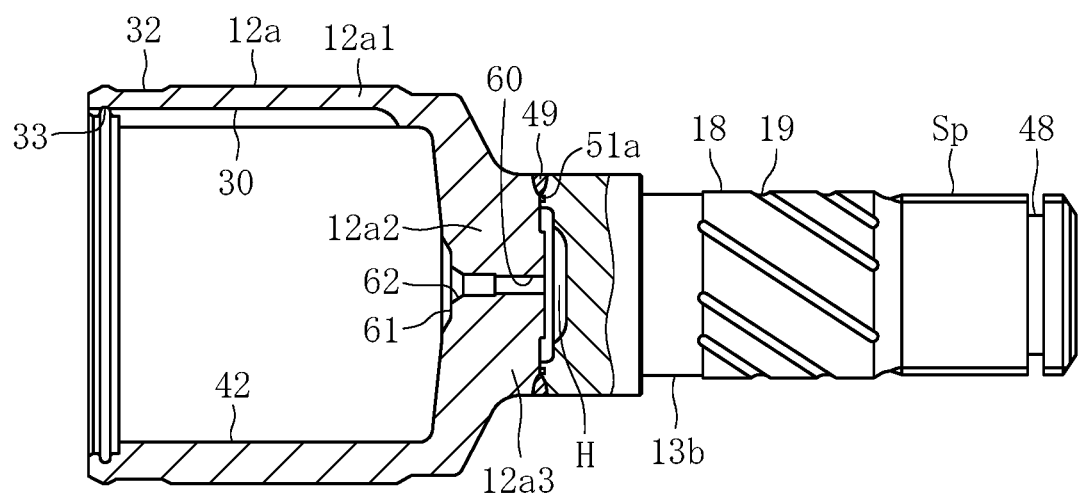
FIG. 10 is a partial vertical sectional view for illustrating an outer joint member that is manufactured using the shaft member of FIG. 9.

Next, to summarize the manufacturing concept, standardization of a product type of the cup member is additionally described while exemplifying a shaft member having a product number different from that of the above-mentioned shaft member 13a of the long stem type illustrated in FIG. 6. A shaft member 13b illustrated in FIG. 9 and FIG. 10 is used as a general stem type on the inboard side. The shaft member 13b has the joining end surface 51 to be brought into abutment against the joining end surface 50 (see FIG. 5b) of the bottom portion 12a2 (projecting portion 12a3) of the cup member 12a. The outer diameter B2 and the inner diameter E of the joining end surface 51 are set to the equal dimensions to the outer diameter B2 and the inner diameter E of the joining end surface 51 of the shaft member 13a of the long stem type illustrated in FIG. 6c.

The shaft member 13b is used as the general stem type on the inboard side. Accordingly, the shaft member 13b comprises a shaft section with a small length, and a sliding bearing surface 18 formed on an axial center portion thereof, and a plurality of oil grooves 19 are formed in the sliding bearing surface 18. The spline Sp and a snap ring groove 48 are formed in an end portion of the shaft member 13b on the side opposite to the cup member 12a side. As described above, even when there are differences in types, such as the general length stem type and the long stem type, and shaft diameters and outer peripheral shapes vary in each vehicle type, the outer diameter B2 of the joining end surface 51 of the shaft members 13a and 13b is set to an equal dimension. Further, the welding spatter receiving groove 51a of the shaft members 13a and 13b are also set to an equal dimension for each joint size.

The outer diameters B1 and B2 of the joining end surface 50 of the cup member 12a and the joining end surface 51 of the shaft members 13a and 13b are set to an equal dimension for each joint size. Thus, the cup member prepared for common use for each joint size, and the shaft member having a variety of specifications of the shaft section for each vehicle type can be prepared in a state before heat treatment. Further, the intermediate component of each of the cup member 12a and the shaft members 13a and 13b can be assigned with a product number for management. Even when standardizing product types of the cup member 12a, various types of the outer joint members 11 satisfying requirements can be produced quickly through combination of the cup member 12a and the shaft members 13a and 13b each having a variety of specifications of the shaft section for each vehicle type. Therefore, standardization of a product type of the cup member 12a can reduce cost and alleviate a burden of production management.

The standardization of the product type of the cup member is described above by taking the differences in types, such as the general length stem type and the long stem type, as an example for easy understanding, but the present invention is not limited thereto. The same applies to standardization of the product type of the cup member for shaft members having a variety of specifications of the shaft section for each vehicle type among the general length stem types, and for shaft members having a variety of specifications of the shaft section for each vehicle type among the long stem types.

Figure 11:
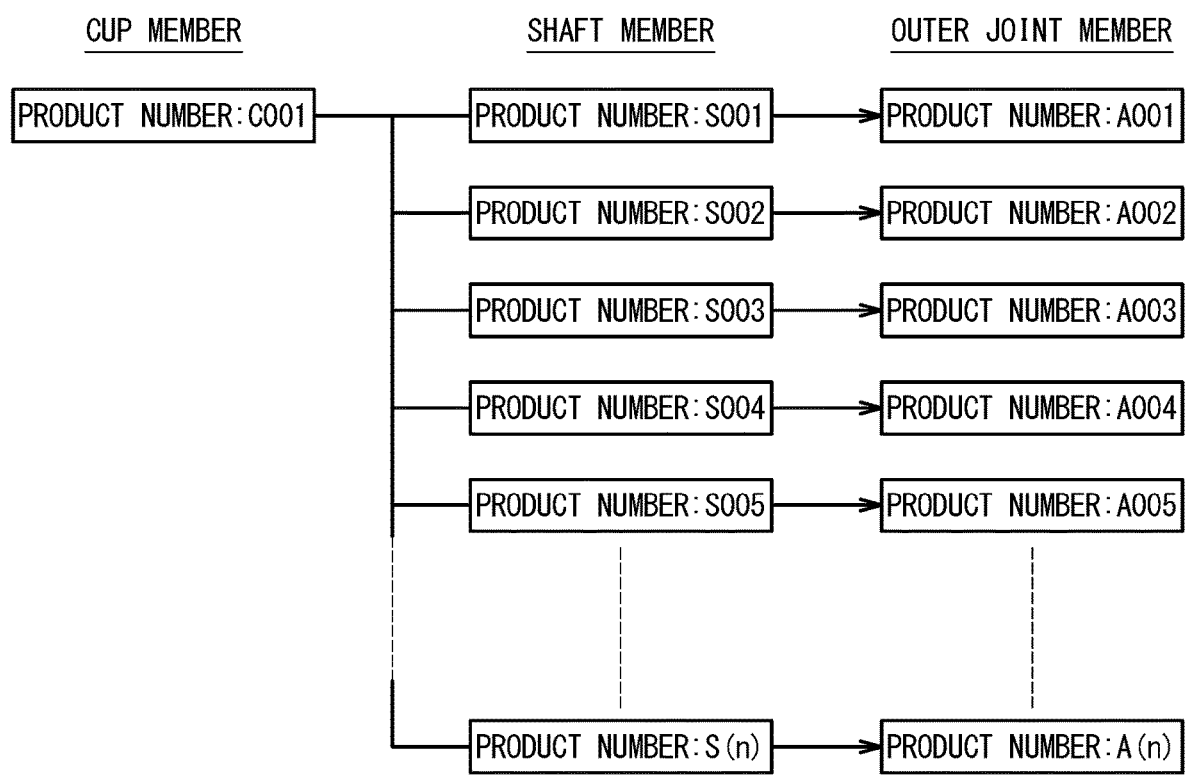
FIG. 11 is a diagram for illustrating an example of standardization of a product type of the cup member.

As a summary of the above description, FIG. 11 is a diagram for illustrating an example of standardization of a product type of the cup member according to the first embodiment. As illustrated in FIG. 11, the cup member is prepared for common use for one joint size, and is assigned with, for example, a product number C001 for management. In contrast, the shaft member has a variety of specifications of the shaft section for each vehicle type, and is assigned with, for example, a product number S001, S002, or S(n) for management. For example, when the cup member assigned with the product number C001 and the shaft member assigned with the product number S001 are combined and welded to each other, the outer joint member assigned with a product number A001 can be produced. Thus, owing to standardization of a product type of the cup member, it is possible to reduce cost and to alleviate a burden of production management. In the standardization of a product type, the cup member is not limited to one type for one joint size, that is, not limited to one type assigned with a single product number. For example, the cup member comprises cup members of a plurality of types (assigned with a plurality of product numbers, respectively) that are prepared for one joint size based on different specifications of a maximum operating angle, and are each prepared so that the outer diameter B1 of the joining end surface of each of those cup members has an equal dimension.

Figure 12A:
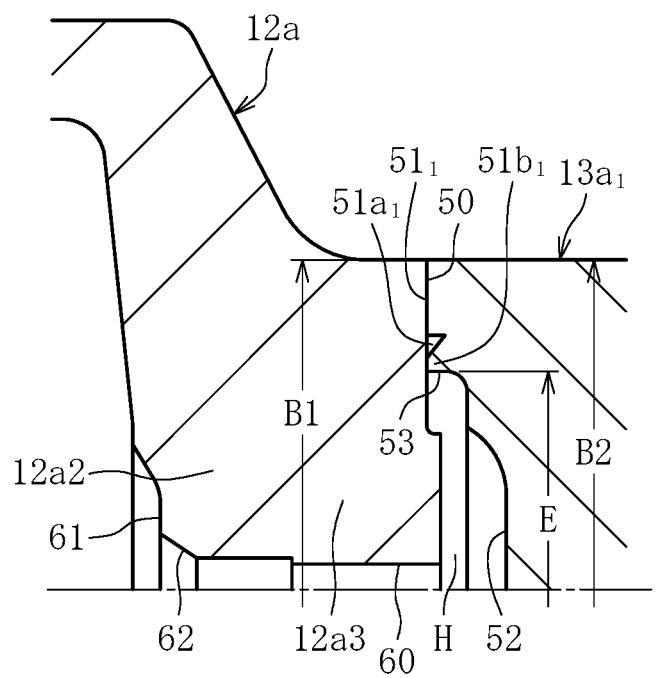
FIG. 12a is an illustration of a modification example of a welding spatter receiving groove, and is a vertical sectional view for illustrating a state before welding.
Figure 12B:
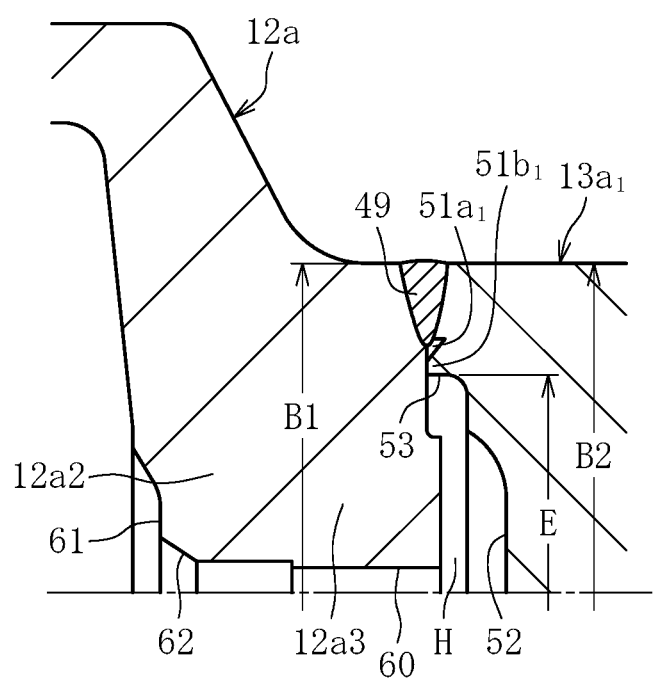
FIG. 12b is an illustration of the modification example of the welding spatter receiving groove, and is a vertical sectional view for illustrating a state after welding.

Next, a modification example of the welding spatter receiving groove is described with reference to FIG. 12. FIG. 12a is a vertical sectional view for illustrating a state before welding. FIG. 12b is a vertical sectional view for illustrating a state after welding. A welding spatter receiving groove $51a_1$ of the modification example has a traced shape that is formed so that a groove surface on the radially inner side is inclined. Therefore, at the timing of turning of a joining end surface $51_1$ of the shaft member $13a_1$, the joining end surface $51_1$ and the welding spatter receiving groove $51a_1$ can be processed in one step by tracer turning. Thus, additional turning step for of the welding spatter receiving groove $51a_1$ with use of a cut-off tool may be omitted, thereby being capable of shortening the turning step. Other configurations are the same as those of the outer joint member 11 according to the first embodiment. Therefore, the parts having the same functions are denoted by the same reference symbols (except for subscripts). All the details of the description above with regard to the outer joint member and the manufacturing method therefor according to the first embodiment are applied to this modification example, and description thereof is omitted.

Figure 13A:
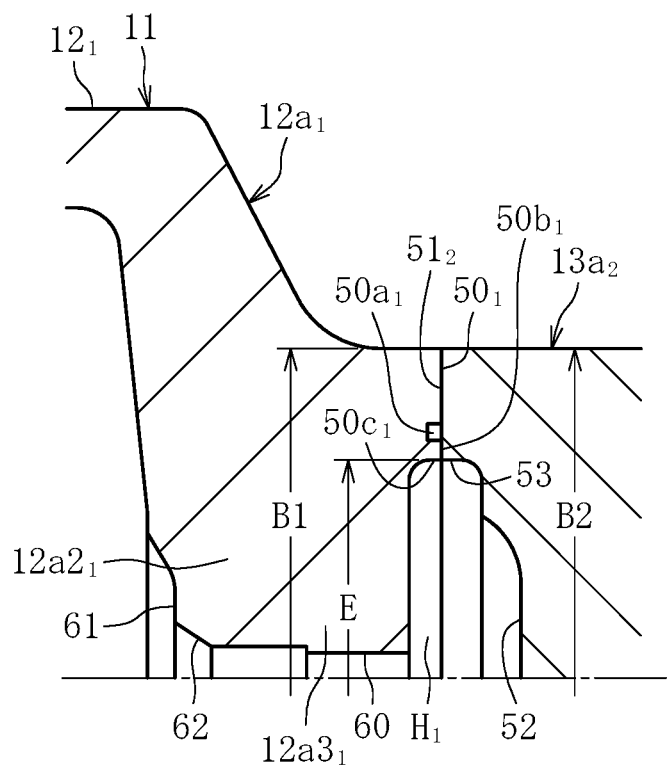
FIG. 13a is an illustration of another modification example of the welding spatter receiving groove, and is a vertical sectional view for illustrating a state before welding.
Figure 13B:
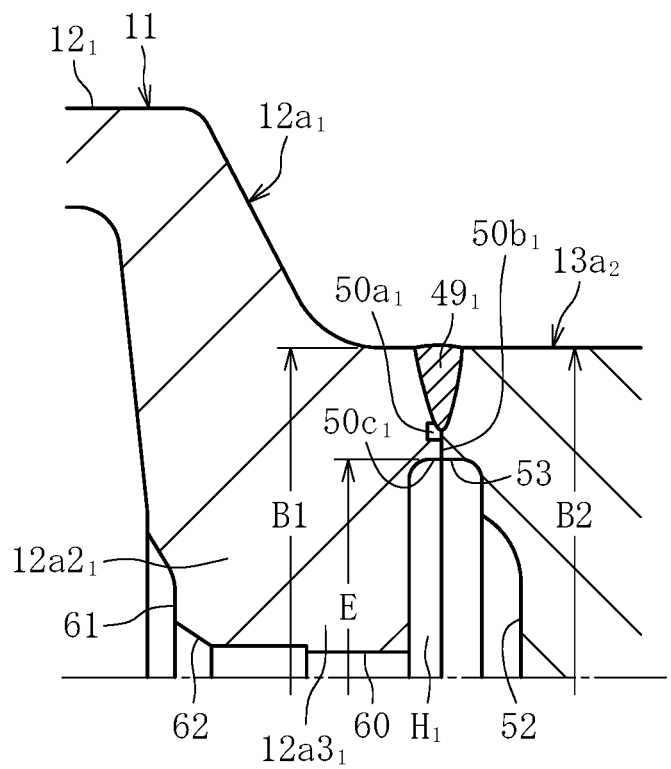
FIG. 13b is an illustration of the another modification example of the welding spatter receiving groove, and is a vertical sectional view for illustrating a state after welding.

Another modification example of the welding spatter receiving groove is described with reference to FIG. 13. FIG. 13a is a vertical sectional view for illustrating a state before welding. FIG. 13b is a vertical sectional view for illustrating a state after welding. A welding spatter receiving groove $50a_1$ of the modification example is different from the outer joint member according to the first embodiment in that the welding spatter receiving groove $50a_1$ is formed in a joining end surface $50_1$ of a cup member $12a_1$, and that a radially inner surface (inner diameter E) is formed on the radially inner side of the welding spatter receiving groove $50a_1$. Other configurations are the same as those of the outer joint member 11 according to the first embodiment. Therefore, the parts having the same functions are denoted by the same reference symbols (except for subscripts). All the details of the description above with regard to the outer joint member and the manufacturing method therefore according to the first embodiment are applied in this modification example, and description thereof is omitted.

Figure 14:
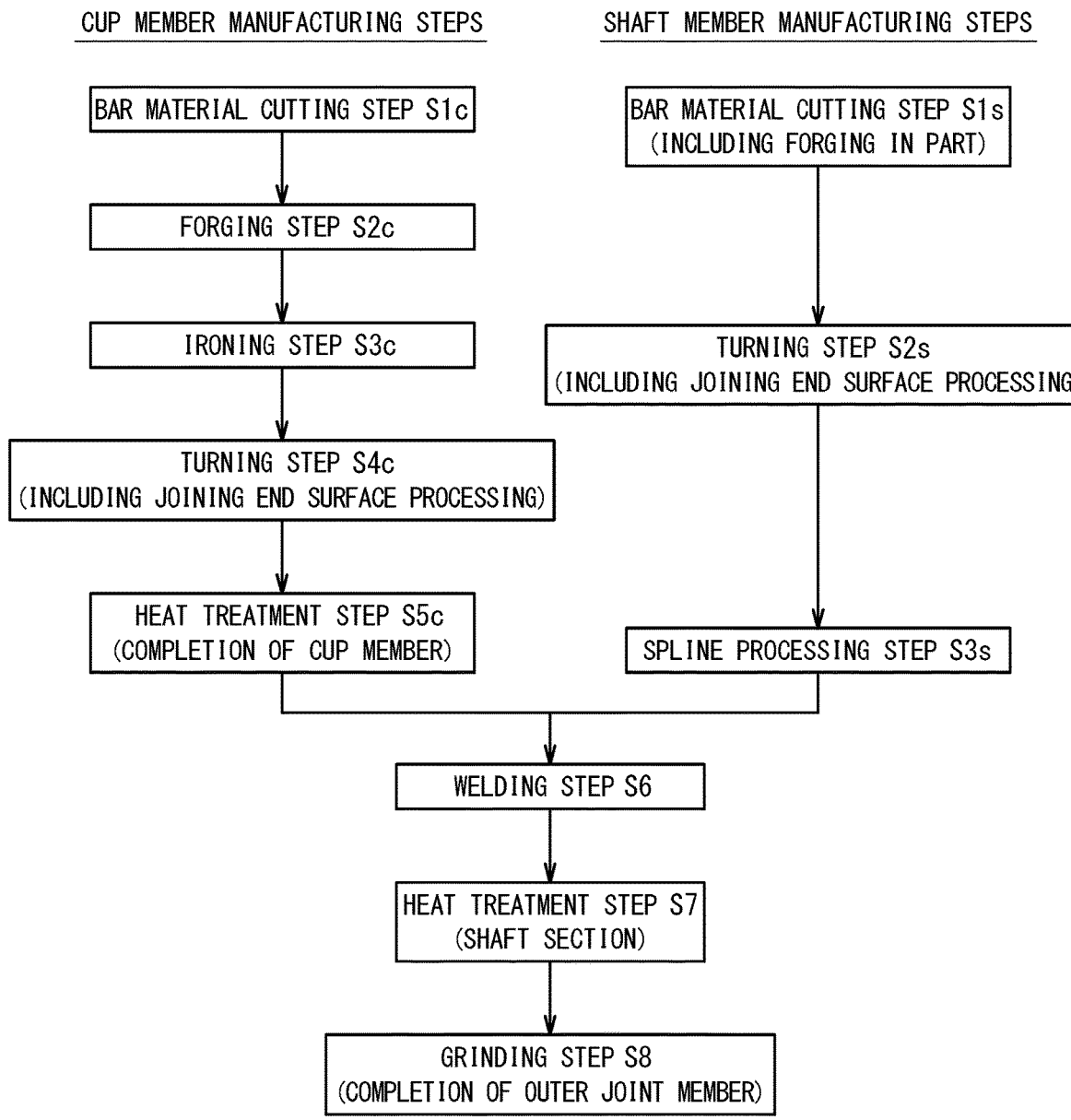
FIG. 14 is an illustration of an overview of a modification example of manufacturing steps for the outer joint member of FIG. 1.

FIG. 14 is an illustration of a modification example of a method of manufacturing the outer joint member. In the manufacturing steps of the modification example, the heat treatment step for the cup member, which is involved in the heat treatment step S7 in FIG. 4 as described above, is provided before the welding step S6 in the sequence and named "heat treatment step S5c", to thereby prepare the cup member as a finished product. Details of other aspects of the modification example than this aspect, that is, details of the overview of the respective steps, the states of the cup member and the shaft member in the main processing steps, the preparation of the cup member for common use, the welding method, the standardization of the product type, the configuration of the outer joint member, and the like as described above in connection with the outer joint member according to the first embodiment are the same as those of the first embodiment. Therefore, all the details of the first embodiment are applied in the modification example, and only the difference is described.

As illustrated in FIG. 5b, the cup member 12a has a shape extending from the joining end surface 50 to the large-diameter cylindrical portion 12a1 via the bottom portion 12a2, and the portions to be subjected to heat treatment that involves quenching and tempering are the track grooves 30 and the cylindrical inner peripheral surface 42 located at the inner periphery of the cylindrical portion 12a1. Therefore, the cup member 12a generally has no risk of thermal effect on the heat-treated portion during the welding. For this reason, the cup member 12a is subjected to heat treatment before the welding to be prepared as a finished component. The manufacturing steps of the modification example are suitable in practical use.

In the manufacturing steps of the modification example, the cup member 12a is subjected to heat treatment for preparing the cup member 12a as a finished product, and is therefore assigned with a product number indicating a finished product for management. Thus, the standardization of the product type of the cup member 12a remarkably reduces the cost and alleviates the burden of production management. Further, the cup member 12a can be manufactured solely until the cup member 12a is completed as a finished product through the forging, turning, and heat treatment. Thus, the productivity is enhanced by virtue of reduction of setups and the like as well.

In the modification example, in FIG. 11 for illustrating the example of standardization of the product type of the cup member as described above in connection with the outer joint member according to the first embodiment, only the product number of the cup member in FIG. 11 is changed to the product number indicating a finished product, whereas the product numbers of the shaft member and the outer joint member are the same as those of the first embodiment. Therefore, description thereof is omitted herein.

Figure 15:
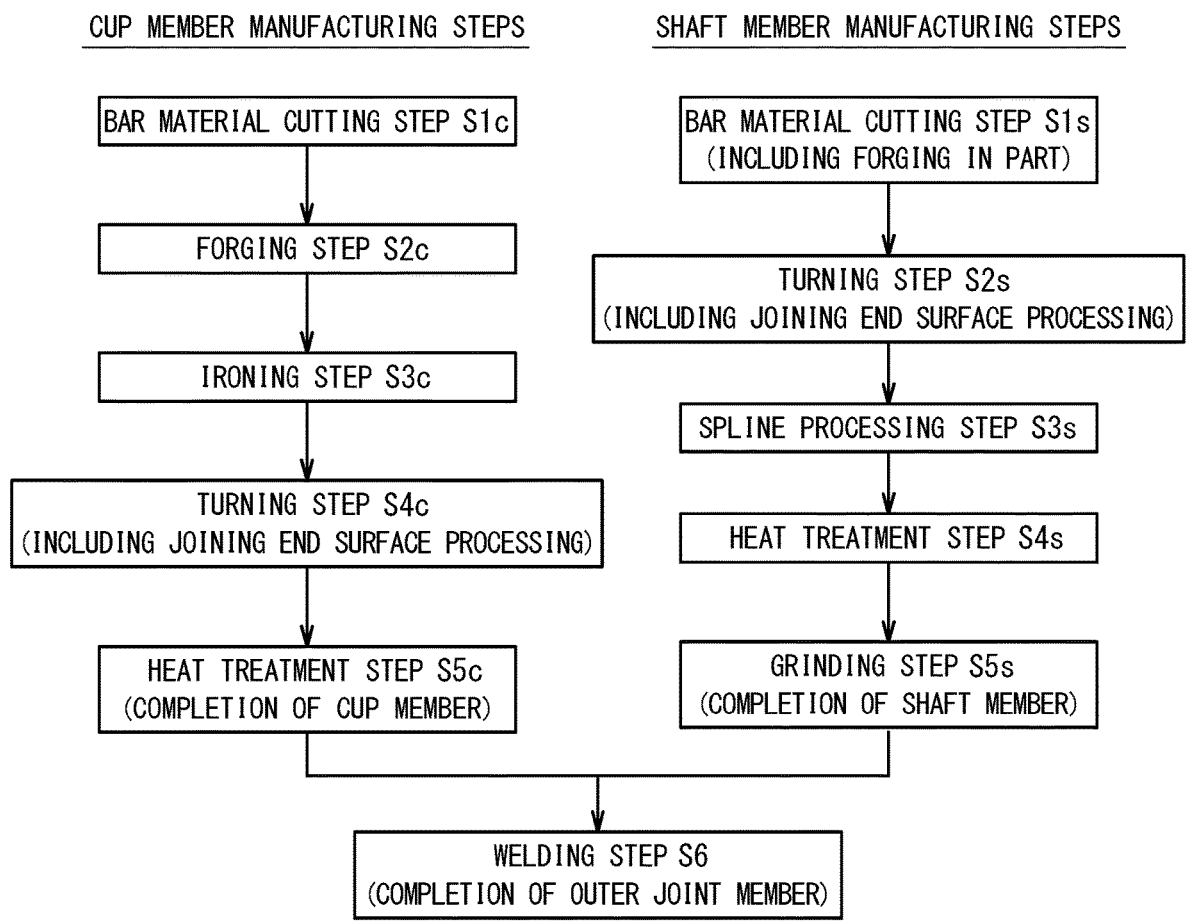
FIG. 15 is an illustration of an overview of another modification example of manufacturing steps for the outer joint member of FIG. 1.

FIG. 15 is an illustration of another modification example of the method of manufacturing the outer joint member. In the manufacturing steps of the modification example, the heat treatment steps for the cup section and the shaft section, which are involved in the heat treatment step S7 in FIG. 4 as described above in the first embodiment, and the grinding step S8 for the shaft section in FIG. 4 are provided before the welding step S6 in the sequence and named "heat treatment step S5c for cup member", "heat treatment step S4s for shaft member", and "grinding step S5s". Thus, both the cup member and the shaft member are prepared as finished products. Details of other aspects of the modification example than this aspect, that is, details of the overview of the respective steps, the states of the cup member and the shaft member in the main processing steps, the preparation of the cup member for common use, the welding method, the standardization of the product type, the configuration of the outer joint member, and the like as described above in connection with the outer joint member according to the first embodiment are the same as those of the first embodiment. Therefore, all the details of the first embodiment are applied in the modification example, and only the difference is described.

After the spline processing step S3s, a hardened layer having a hardness of approximately from 50 HRC to 62 HRC is formed in a predetermined range of the outer peripheral surface of the shaft member by induction quenching in the heat treatment step S4s. Heat treatment is not performed on a predetermined portion in the axial direction, which includes the joining end surface 51. The heat treatment for the cup member, the assignment of the product number, and the like are the same as those of the modification example of the manufacturing method described above, and redundant description is therefore omitted herein.

After the heat treatment step S4s, the shaft member is transferred to the grinding step S5s so that the bearing mounting surface 14 and the like are finished. Thus, the shaft member is obtained as a finished product. Then, the shaft member is assigned with a product number indicating a finished product for management. The manufacturing steps of the modification example are suitable in a case of a cup member and a shaft member having shapes and specifications with no risk of thermal effect on the heat-treated portion during the welding.

In the manufacturing steps of the modification example, both the cup member and the shaft member can be assigned with product numbers indicating finished products for management. Thus, the standardization of the product type of the cup member further remarkably reduces the cost and alleviates the burden of production management. Further, the cup member and the shaft member can be manufactured independently of each other until the cup member and the shaft member are completed as finished products through the forging, turning, heat treatment, grinding after heat treatment, and the like. Thus, the productivity is further enhanced by virtue of reduction of setups and the like as well.

In the modification example, in FIG. 11 for illustrating the example of standardization of the product type of the cup member as described above in connection with the outer joint member according to the first embodiment, the product numbers of the cup member and the shaft member in FIG. 11 are changed to the product numbers indicating finished products. The product number of the outer joint member is the same as that of the first embodiment. Therefore, description thereof is omitted herein. Note that, the cup member and the shaft member to be prepared as finished components are not limited to the cup member and the shaft member subjected to finishing such as the above-mentioned grinding after heat treatment or cutting after quenching, but encompass a cup member and a shaft member in a state in which the heat treatment is completed while the finishing is uncompleted.

As described in the standardization of the product type, the cup member is not limited to one type for one joint size, that is, not limited to one type assigned with a single product number. Specifically, as described above, the cup member encompasses, for example, cup members of a plurality of types (assigned with a plurality of product numbers, respectively) that are prepared for one joint size based on different specifications of a maximum operating angle, and are also prepared so that the outer diameters B1 of the above-mentioned joining end surfaces of the cup members are set to equal dimensions. In addition, the cup member encompasses, for example, cup members of a plurality of types (assigned with a plurality of product numbers, respectively) that are prepared for one joint size in order to achieve management of the cup members in a plurality of forms including intermediate components before heat treatment and finished components in consideration of the joint function, the circumstances at the manufacturing site, the productivity, and the like, and are also prepared so that the outer diameters B1 of the above-mentioned joining end surfaces of the cup members are set to equal dimensions.

Next, an outer joint member according to a second embodiment of the present invention is described with reference to FIG. 16 and FIG. 17. With regard to the constant velocity universal joint and the outer joint member, the parts having the same functions as those of the constant velocity universal joint and the outer joint member illustrated in FIG. 1 and FIG. 2 are denoted by the same reference symbols (except for subscripts), and only the main points are described.

Figure 16:
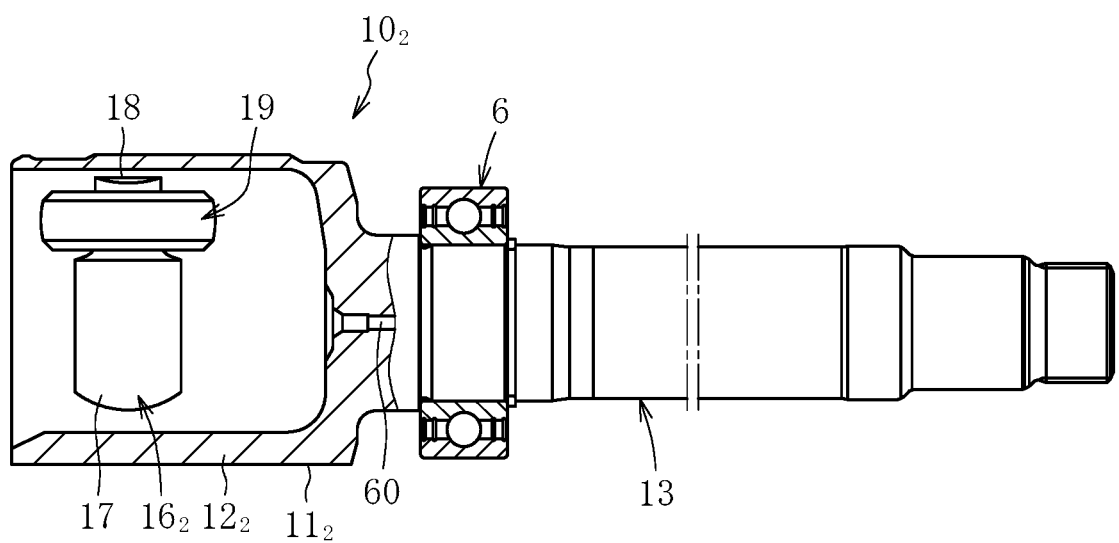
FIG. 16 is a partial vertical sectional view for illustrating an outer joint member of a constant velocity universal joint according to a second embodiment of the present invention.

A plunging type constant velocity universal joint $10_2$ illustrated in FIG. 16 is a tripod type constant velocity universal joint (TJ), and comprises an outer joint member $11_2$ comprising a cup section $12_2$ and the long stem section 13 that extends from a bottom portion of the cup section $12_2$ in the axial direction, an inner joint member $16_2$ housed along an inner periphery of the cup section $12_2$ of the outer joint member $11_2$, and rollers 19 serving as torque transmitting elements that are arranged between the outer joint member $11_2$ and the inner joint member $16_2$. The inner joint member $16_2$ comprises a tripod member 17 comprising three equiangular leg shafts 18 on which the rollers 19 are externally fitted.

The inner ring of the support bearing 6 is fixed to the outer peripheral surface of the long stem section 13, and the outer ring of the support bearing 6 is fixed to the transmission case with the bracket (not shown). The outer joint member $11_2$ is supported by the support bearing 6 in a freely rotatable manner, and thus the vibration of the outer joint member $11_2$ during driving or the like is prevented as much as possible.

Figure 17:
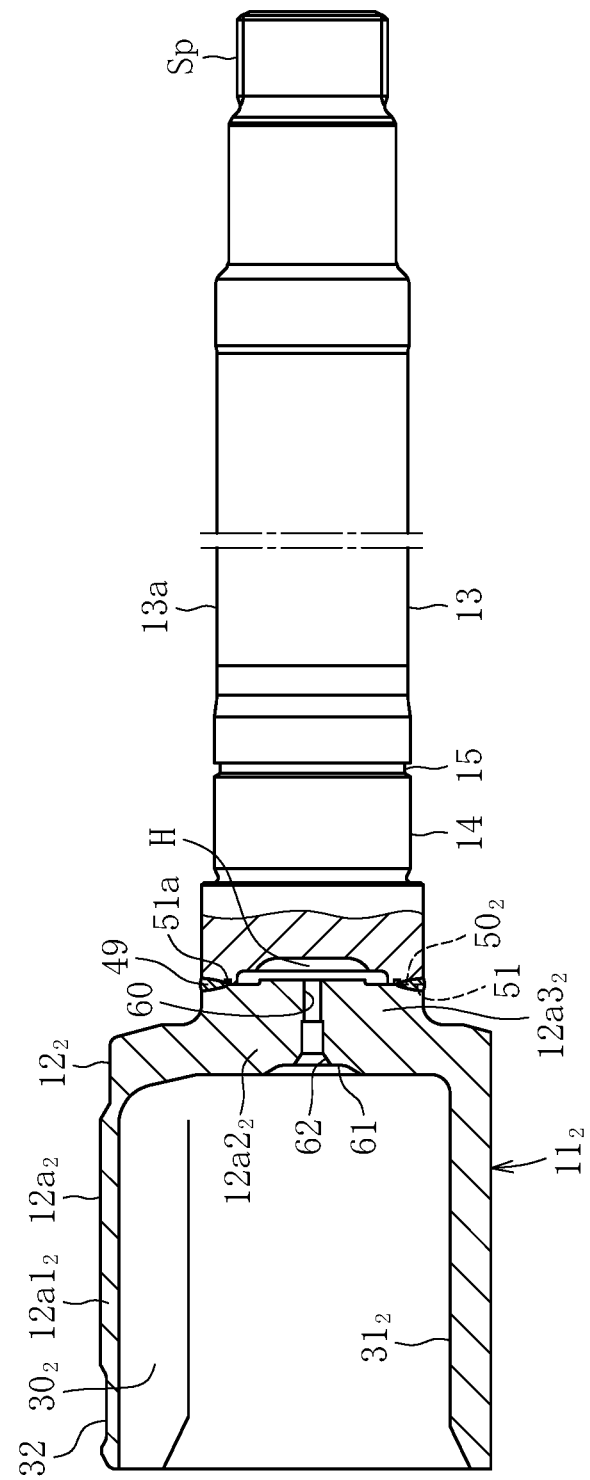
FIG. 17 is an enlarged partial vertical sectional view for illustrating the outer joint member of FIG. 16.

FIG. 17 is a partial vertical sectional view for illustrating the outer joint member $11_2$. As illustrated in FIG. 17, the outer joint member $11_2$ comprises a bottomed cylindrical cup section $12_2$ that is opened at one end and has inner peripheral surfaces $31_2$ and the track grooves $30_2$, on which the rollers 19 (see FIG. 16) are caused to roll, formed at three equiangular positions on an inner peripheral surface of the cup section $12_2$, and the long stem section 13 that extends from a bottom portion of the cup section $12_2$ in the axial direction and comprises the spline Sp serving as the torque transmitting coupling portion formed at the outer periphery of the end portion on the opposite side to the cup section $12_2$ side. The outer joint member $11_2$ is formed by welding the cup member $12a_2$ and the shaft member $13a$ to each other.

As illustrated in FIG. 17, the cup member $12a_2$ is an integrally-formed product having a cylindrical portion $12a1_2$ and a bottom portion $12a2_2$. The cylindrical portion $12a1_2$ has the track grooves $30_2$ and the inner peripheral surfaces $31_2$ formed at the inner periphery thereof. A projecting portion $12a3_2$ is formed at the bottom portion $12a2_2$ of the cup member $12a_2$. The boot mounting groove 32 is formed at an outer periphery of the cup member $12a_2$ on the opening side thereof. The bearing mounting surface 14 and the snap ring groove 15 are formed at the outer periphery of the shaft member $13a$ on the cup member $12a_2$ side, whereas the spline Sp is formed at the end portion on the opposite side to the cup member $12a_2$ side.

A joining end surface $50_2$ formed at the projecting portion $12a3_2$ of the bottom portion $12a2_2$ of the cup member $12a_2$ and the joining end surface 51 formed at the end portion of the shaft member $13a$ on the cup member $12a_2$ side are brought into abutment against each other, and are welded to each other by electron beam welding performed from the radially outer side. The welded portion 49 is formed of a bead formed by a beam radiated from the radially outer side of the cup member $12a_2$. Similarly to the outer joint member according to the first embodiment, the welding spatter receiving groove $51a$ is formed on the radially inner side of the joining end surface 51 of the shaft member $13a$, and the ventilation hole 60 that communicates with the hollow cavity portion H is formed at the axial center of the bottom portion $12a2_2$ of the cup member $12a2$. The outer diameters of the joining end surface $50_2$ and the joining end surface 51 are set to equal dimensions for each joint size. The welded portion 49 is formed on the joining end surface 51 located on the cup member $12a_2$ side with respect to the bearing mounting surface 14 of the shaft member $13a$, and hence the bearing mounting surface 14 and the like can be processed in advance so that post-processing after welding can be omitted. Further, due to the electron beam welding, burrs are not generated at the welded portion. Thus, post-processing for the welded portion can also be omitted, which can reduce the manufacturing cost.

With regard to other configurations, the outer joint member $11_2$ is the same as the details described above in connection with the outer joint member 11 according to the above-mentioned first embodiment, and hence the overview of the respective steps, the states of the cup member and the shaft member in the main processing steps, the preparation of the cup member for common use, the welding method, standardization of the product type, the configuration of the outer joint member, and the like as described above in connection with the outer joint member according to the first embodiment are the same as those of the first embodiment. Therefore, all the details of the first embodiment are applied in the second embodiment, and description thereof is omitted.

In the above-mentioned embodiments, the case to which electron beam welding is applied is described, but laser welding is also similarly applicable.

In the outer joint member according to the embodiments and described above, the cases where the present invention is applied to the double-offset type constant velocity universal joint as the plunging type constant velocity universal joint 10, and to the tripod type constant velocity universal joint as the plunging type constant velocity universal joint 10 are described. However, the present invention may be applied to an outer joint member of another plunging type constant velocity universal joint such as a cross-groove type constant velocity universal joint, and to an outer joint member of a fixed type constant velocity universal joint. Further, in the above, the present invention is applied to the outer joint member of the constant velocity universal joint, which is used to construct the drive shaft. However, the present invention may be applied to an outer joint member of a constant velocity universal joint, which is used to construct a propeller shaft.

The present invention is not limited to the above-mentioned embodiments. As a matter of course, various modifications can be made thereto without departing from the gist of the present invention. The scope of the present invention is defined in Claims, and encompasses equivalents described in Claims and all changes within the scope of claims.

REFERENCE SIGNS LIST 1 drive shaft
2 intermediate shaft
3 spline
4 boot
5 boot
6 support bearing
10 plunging type constant velocity universal joint
11 outer joint member
11' workpiece
12 cup section
12a cup member
$12a_1$ cylindrical portion
$12a_2$ bottom portion
13 long shaft section
13a shaft member
14 bearing mounting surface
16 inner joint member
17 tripod member
19 torque transmitting element (roller)
20 fixed type constant velocity universal joint
21 outer joint member
22 inner joint member
23 torque transmitting element (ball)
24 cage
30 track groove
31 inner peripheral surface
40 track groove
41 torque transmitting element (ball)
42 cylindrical inner peripheral surface
49 welded portion
50 joining end surface
$50a_1$ welding spatter receiving groove
51 joining end surface
51a welding spatter receiving groove
$51a_1$ welding spatter receiving groove
60 ventilation hole
62 center hole
100 welding apparatus
101 electron gun
108 case
109 vacuum pump
111 sealed space
B1 outer diameter
B2 outer diameter
D inner diameter
E inner diameter
H hollow cavity portion
$H_1$ hollow cavity portion
O joint center
$O_1$ curvature center
$O_2$ curvature center

The invention claimed is:

1. An outer joint member of a constant velocity universal joint, the outer joint member comprising:

a cup section having track grooves formed in an inner periphery of the cup section, the track grooves being engageable with torque transmitting elements; and a shaft section formed at a bottom portion of the cup section, wherein the outer joint member is constructed by forming the cup section and the shaft section as separate members, and by bringing a cup member forming the cup section and a shaft member forming the shaft section into abutment against each other and welding the cup member and the shaft member, the cup member has a first joining end surface and the shaft member has a second joining end surface, the first and second joining end surfaces abutting against each other to thereby form a hollow cavity portion, the cup member has, at an axial center of the cup member, a ventilation hole that communicates with the hollow cavity portion, one of the first and second joining end surfaces has a welding spatter receiving groove formed on a radially inner side thereof, one of the first and second joining end surfaces has an annular blocking portion formed on a radially inner side of the welding spatter receiving groove, a gap being formed between the annular blocking portion and another of the first and second joining end surfaces, and the welding spatter receiving groove is vented to the hollow cavity portion through the gap.

2. The outer joint member of a constant velocity universal joint according to claim 1, wherein the ventilation hole has a center hole.

3. The outer joint member of a constant velocity universal joint according to claim 1, wherein the welding spatter receiving groove has a rectangular cross section on a plane that is parallel to and intersects a central axis of the outer joint member.

4. The outer joint member of a constant velocity universal joint according to claim 1, wherein the welding spatter receiving groove has a triangular cross section on a plane that is parallel to and intersects a central axis of the outer joint member.

5. The outer joint member of a constant velocity universal joint according to claim 1, wherein the one of the first and second joining end surfaces having the welding spatter receiving groove and the one of the first and second joining end surfaces having an annular blocking portion are the same.

6. An outer joint member of a constant velocity universal joint, the outer joint member comprising:

a cup section having track grooves formed in an inner periphery of the cup section, the track grooves being engageable with torque transmitting elements; and a shaft section located at a bottom portion of the cup section, wherein the cup section has an end portion and the shaft section has an end portion, the end portion of the cup section being attached to the end portion of the shaft section by a weld, the end portion of the cup section has a first joining end surface and the end portion of the shaft section has a second joining end surface, the first and second joining end surfaces abutting against each other to thereby form a hollow cavity portion, the cup section has, at an axial center of the cup section, a ventilation hole that communicates with the hollow cavity portion, one of the first and second joining end surfaces has a welding spatter receiving groove formed on a radially inner side thereof, one of the first and second joining end surfaces has an annular blocking portion formed on a radially inner side of the welding spatter receiving groove, a gap being formed between the annular blocking portion and another of the first and second joining end surfaces, and the welding spatter receiving groove is vented to the hollow cavity portion through the gap.

7. The outer joint member of a constant velocity universal joint according to claim 6, wherein the ventilation hole has a center hole.

8. The outer joint member of a constant velocity universal joint according to claim 6, wherein the welding spatter receiving groove has a rectangular cross section on a plane that is parallel to and intersects a central axis of the outer joint member.

9. The outer joint member of a constant velocity universal joint according to claim 6, wherein the welding spatter receiving groove has a triangular cross section on a plane that is parallel to and intersects a central axis of the outer joint member.

10. The outer joint member of a constant velocity universal joint according to claim 6, wherein the one of the first and second joining end surfaces having the welding spatter receiving groove and the one of the first and second joining end surfaces having an annular blocking portion are the same.

11. An outer joint member kit for a constant velocity universal joint, the outer joint member kit comprising:

a cup section having track grooves formed in an inner periphery of the cup section, the track grooves being engageable with torque transmitting elements; and a plurality of shaft sections each of the plurality of shaft sections having at a dimension that is different from a remainder of the plurality of shaft sections, wherein the cup section has an end portion and the shaft sections each have an end portion, the end portion of the cup section being attachable to the end portion of one of the shaft sections by a weld, the end portion of the cup section has a first joining end surface and the end portion of each of the shaft sections has a second joining end surface, the first joining end surface of the cup section and the second joining end surface of the one of the shaft sections abutting against each other to thereby form a hollow cavity portion when the cup section and the one of the shaft sections are attached, the cup section has, at an axial center of the cup section, a ventilation hole that communicates with the hollow cavity portion, the second joining end surface of each of the shaft sections has a welding spatter receiving groove formed on a radially inner side thereof, the second joining end surface of each of the shaft sections has an annular blocking portion formed on a radially inner side of the welding spatter receiving groove, a gap is formed between the annular blocking portion of the one of the shaft sections and the first joining end surface of the cup section when the cup section and the one of the shaft sections are attached, the welding spatter receiving groove is vented to the hollow cavity portion through the gap when the cup section and the one of the shaft sections are attached, and the welding spatter receiving grooves of the shaft sections all have equal dimensions.

* * * * *